United States Patent
Oike

(10) Patent No.: US 9,509,733 B2
(45) Date of Patent: Nov. 29, 2016

(54) PROGRAM, COMMUNICATION APPARATUS AND CONTROL METHOD

(71) Applicant: Kenji Oike, Nagoya (JP)

(72) Inventor: Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 426 days.

(21) Appl. No.: 14/226,951

(22) Filed: Mar. 27, 2014

(65) Prior Publication Data

US 2014/0298205 A1 Oct. 2, 2014

(30) Foreign Application Priority Data

Mar. 29, 2013 (JP) ................................. 2013-070742

(51) Int. Cl.
*G06F 3/00* (2006.01)
*H04L 29/06* (2006.01)
*G06F 3/0484* (2013.01)

(52) U.S. Cl.
CPC ......... *H04L 65/403* (2013.01); *G06F 3/04845* (2013.01); *H04L 65/1093* (2013.01); *H04L 65/4038* (2013.01)

(58) Field of Classification Search
CPC ............. H04L 65/403; H04L 65/1093; H04L 65/4038; G06F 3/04845
See application file for complete search history.

(56) References Cited

U.S. PATENT DOCUMENTS

| | | | | |
|---|---|---|---|---|
| 7,185,054 B1* | 2/2007 | Ludwig | ................. | G06F 3/0482 348/E7.081 |
| 2002/0169831 A1* | 11/2002 | Lee | ......................... | G06F 3/033 709/204 |
| 2005/0071430 A1* | 3/2005 | Kobayashi | ............... | H04N 7/15 709/205 |

FOREIGN PATENT DOCUMENTS

| | | |
|---|---|---|
| JP | H09-198228 A | 7/1997 |
| JP | 2009-053784 A | 3/2009 |

* cited by examiner

*Primary Examiner* — Anil N Kumar
(74) *Attorney, Agent, or Firm* — Banner & Witcoff, Ltd.

(57) ABSTRACT

In a communication apparatus, a first portion of a shared material is displayed in a first display area within a remote conference screen which is displayed in a display connected to the communication apparatus. When the communication apparatus is in a state for receiving an input of an annotation to the shared material, a second display area is set as an area for receiving a first input. When the first input is received, a portion of the shared material displayed in the first display area is changed from the first portion to a second portion of the shared material. When a second input is received to a position outside the second display area, an annotation corresponding to the second input is displayed to be superimposed on the first portion in the first display area.

20 Claims, 20 Drawing Sheets

FIG. 12

| | L1 | L2 | L3 | L4 | L5 |
|---|---|---|---|---|---|
| C5 | 1:(0,0,0)<br>2:(0,0,0) | 1:(0,0,0)<br>2:(0,0,0) | 1:(0,1,1)<br>2:(0,0,0) | 1:(1,1,2)<br>2:(0,0,0) | 1:(2,1,3)<br>2:(0,0,0) |
| C4 | 1:(0,0,0)<br>2:(0,0,0) | 1:(0,0,0)<br>2:(1,0,0) | 1:(0,1,1)<br>2:(0,0,0) | 1:(1,2,3)<br>2:(0,0,0) | 1:(1,1,2)<br>2:(0,0,0) |
| C3 | 1:(0,0,0)<br>2:(0,0,0) | 1:(0,0,0)<br>2:(1,0.5) | 1:(0,1,1)<br>2:(1,0.5) | 1:(0,1,1)<br>2:(2,1,0) | 1:(0,1,1)<br>2:(0,0,0) |
| C2 | 1:(0,0,0)<br>2:(0,0,0) | 1:(0,0,0)<br>2:(1,0.5) | 1:(0,0,0)<br>2:(0,0,0) | 1:(0,0,0)<br>2:(3,1.5) | 1:(0,0,0)<br>2:(0,0,0) |
| C1 | 1:(0,0,0)<br>2:(0,0,0) | 1:(0,0,0)<br>2:(0,0,0) | 1:(0,0,0)<br>2:(0,0,0) | 1:(0,0,0)<br>2:(0,0,0) | 1:(0,0,0)<br>2:(0,0,0) |

*FIG. 14*

| | | | 38A | | |
|---|---|---|---|---|---|
| L1 | (1) | (1) | (2) | (3) | (4) |
| L2 | (1) | (3.5) | (4) | (5) | (3) |
| L3 | (1) | (2.5) | (5.5) | (3) | (2) |
| L4 | (1) | (2) | (2) | (2.5) | (1) |
| L5 | (1) | (1) | (1) | (1) | (1) |
| | C1 | C2 | C3 | C4 | C5 |

PROGRAM, COMMUNICATION APPARATUS AND CONTROL METHOD

CROSS-REFERENCE TO RELATED APPLICATION

This application claims priority from Japanese Patent Application No. 2013-070742, filed on Mar. 29, 2013, the entire subject matter of which is incorporated herein by reference.

TECHNICAL FIELD

This disclosure relates to a program which is executable by a computer for controlling a communication apparatus which can be operated by a user participating in a remote conference through a network, the communication apparatus and a control method.

BACKGROUND

There have been proposed techniques relating to a remote conference through a network. For example, a shared-view display method has been known as a technique relating to communication support when using an electronic communication tool, for example, on a computing device such as a personal computer, to perform a communication conference or cooperation work. In this display method, a shared-view display layer is newly generated between a material display layer and a cooperative drawing layer for cooperative editing. This shared-view display layer displays information on which part of a material each of participants is displaying. These layers are superimposed and are synthetically displayed. According to this display method, a user can freely change shared-material display by scrolling, magnification change, or the like. Further, since a user can easily recognize differences in display of the shared material which the user and the other participants are displaying or since the shared state of a view of the shared material, it becomes possible to easily perform an operation such as pointing or editing during cooperative work.

SUMMARY

A remote conference system including a plurality of communication apparatuses connected through a network has been put to practical use. In the remote conference system, users participating in a remote conference operate communication apparatuses connected through the network, respectively, whereby the remote conference is performed. In the remote conference, shared material data may be shared by the respective communication apparatuses. In the respective communication apparatuses, a shared material corresponding to the shared material data is displayed, and the users of the communication apparatuses use the shared material to participate in the remote conference. Further, the respective communication apparatuses can be used to input annotations to the shared material. In this case, an annotation input by a predetermined communication apparatus is displayed together with the shared material also in other communication apparatuses.

In a case where a communication apparatus is a portable terminal like a smart phone or a tablet terminal including a display having a small screen size, a display area for displaying the shared material is small. In the small display area, only a portion of the shared material may be displayed. In order to move a portion of the shared material to be displayed, an input for movement is performed to the communication apparatus. The communication apparatus needs to determine whether the input based on a user operation is the annotation input or the movement input. In order to perform this determination, for example, a mode for annotations and a mode for movement may be set, and the user may be requested to perform mode switching. However, in this method, the user needs to perform a switching operation each time switching is needed.

Accordingly, an object of this disclosure is to provide a program which is executable by a computer for controlling a communication apparatus, and can display a shared material and achieve suitable operability to input annotations to the shared material in the communication apparatus which can be operated by a user who participates in a remote conference through a network, the communication apparatus, and a control method.

According to an aspect of this disclosure, a first portion of a shared material is displayed in a first display area within a remote conference screen which is displayed in a display connected to a communication apparatus. In a state where the communication apparatus is in a state for receiving an input of an annotation to the shared material, a second display area is set as an area configured to receive a first input representing changing the first portion displayed in the first display area to a second portion of the shared material. In response to receiving the first input, a portion of the shared material displayed in the first display area is changed from the first portion to the second portion of the shared material. In response to receiving a second input to a position outside the second display area and within the first display area, an annotation corresponding to the second input is displayed to be superimposed on the first portion in the first display area.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 12 is a view showing a procedure of determining first evaluation values and second evaluation values;

FIG. 14 is a view showing a total evaluation value of each section within the first display area;

DETAILED DESCRIPTION

There will be described illustrative embodiments of this disclosure with reference to the accompanying drawings. This disclosure is not limited to a configuration to be described below and can employ various configurations within the same technical concept. For example, a portion of the configuration to be described below may be omitted or may be replaced with any other configuration or the like. This disclosure may include other configurations.

<Remote Conference System>

Figure 1:
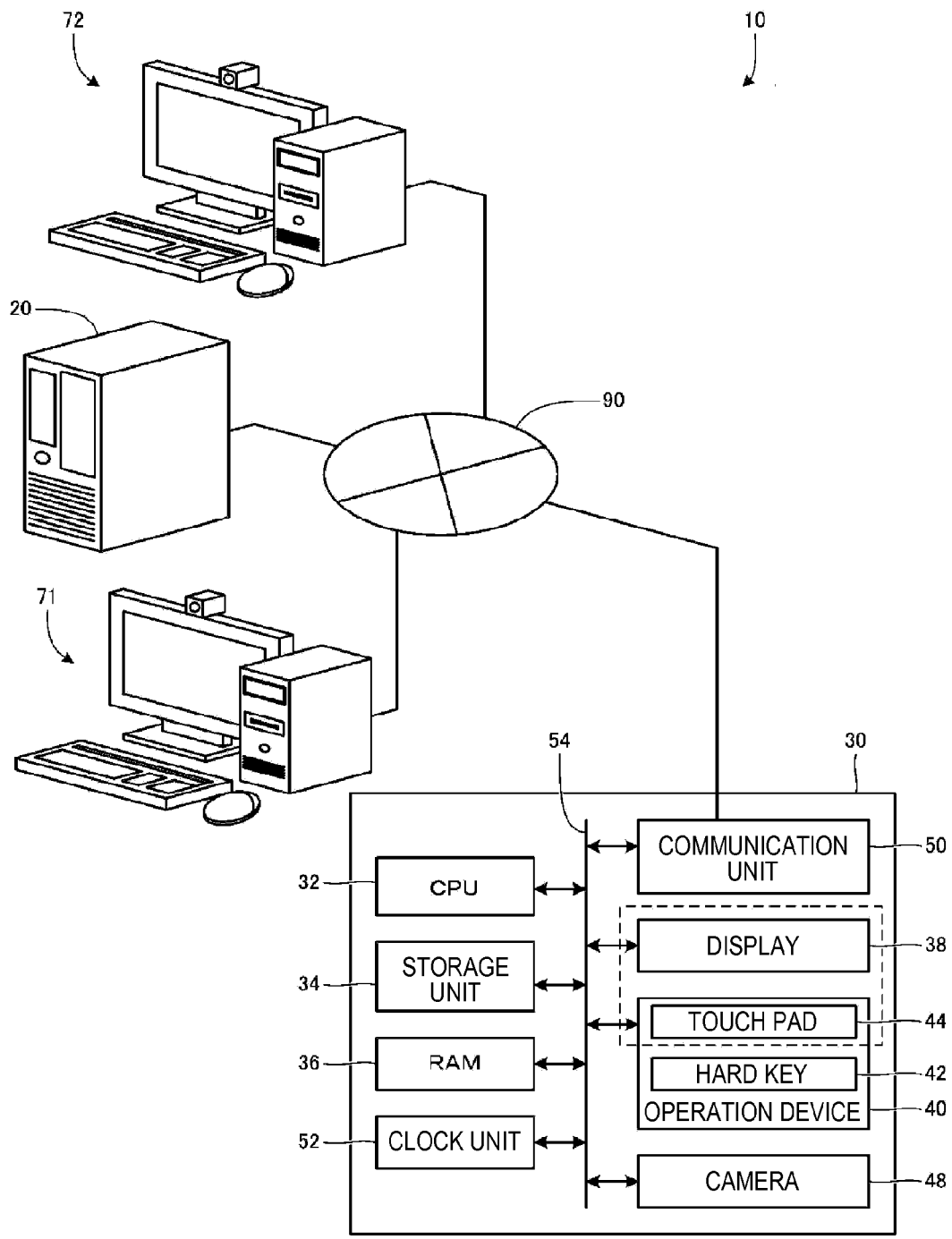
FIG. 1 is a view showing an example of a remote conference system.

An overview of a remote conference system 10 will be described with reference to FIG. 1. As shown in FIG. 1, the remote conference system 10 includes a conference server 20, a communication apparatus 30, and two partner apparatuses 71 and 72. Hereinafter, a remote conference which is performed by the communication apparatus 30 and the two partner apparatuses 71 and 72 will be described as an example. A remote conference by the remote conference system 10 may be performed by the communication apparatus 30 and one partner apparatus, or may be performed by the communication apparatus 30 and three or more partner apparatuses.

The conference server 20, the communication apparatus 30, and the two partner apparatuses 71 and 72 are connected to a network 90. The network 90 is, for example, a network like the Internet. The remote conference by the communication apparatus 30 and the partner apparatuses 71 and 72 is performed through the conference server 20, like in a known remote conference system. The conference server 20 is a server apparatus similar to a conference server in a known remote conference system. Therefore, the conference server 20 will not be described in detail. A remote conference by the remote conference system 10 may be performed by direct communication between the communication apparatus 30 and the partner apparatuses 71 and 72 through the network 90. In this P2P type remote conference, the conference server 20 may be omitted.

The communication apparatus 30 is a terminal device having a function of performing communication through the network 90. The communication apparatus 30 is, for example, a terminal device like a smart phone, a tablet terminal, or a personal computer. Hereinafter, a case where the communication apparatus 30 is a portable terminal like a smart phone or a tablet terminal will be described as an example. The configuration of the communication apparatus 30 will be described below. The partner apparatuses 71 and 72 are known terminal devices like personal computers. The partner apparatuses 71 and 72 may be terminal devices similar to the communication apparatus 30. Therefore, the partner apparatuses 71 and 72 will not be described in detail.

In the remote conference system 10, capture image data captured by the communication apparatus 30 is transmitted from the communication apparatus 30 to the conference server 20. Capture image data captured by the partner apparatus 71 is transmitted from the partner apparatus 71 to the conference server 20, and capture image data captured by the partner apparatus 72 is transmitted from the partner apparatus 72 to the conference server 20. When acquiring the capture image data from the communication apparatus 30 and the partner apparatuses 71 and 72, the conference server 20 transmits the acquired capture image data to the communication apparatus 30 and the partner apparatuses 71 and 72, respectively. For example, the conference server 20 transmits the capture image data captured by each of the partner apparatuses 71 and 72 to the communication apparatus 30. That is, in the remote conference system 10, the capture image data captured by the communication apparatus 30 is transmitted from the communication apparatus 30 to each of the partner apparatuses 71 and 72 through the conference server 20, and the capture image data captured by each of the partner apparatuses 71 and 72 is transmitted from the corresponding partner apparatus 71 or 72 to the communication apparatus 30 through the conference server 20.

The communication apparatus 30 receives the capture image data from the partner apparatuses 71 and 72 by a communication unit 50, thereby acquiring the capture image data. In the communication apparatus 30, the capture image data from the partner apparatuses 71 and 72 is reproduced and displayed. For example, a capture image 381 corresponding to the capture image data captured by the partner apparatus 71, and a capture image 382 corresponding to the capture image data captured by the partner apparatus 72 are displayed (see FIG. 2). In the communication apparatus 30, a capture image 380 corresponding to the capture image data captured by the communication apparatus 30 is also displayed (see FIG. 2).

In the remote conference system 10, a predetermined material (hereinafter, referred to as a shared material) 12 is shared between the communication apparatus 30 and the partner apparatuses 71 and 72. In the communication apparatus 30 and the partner apparatuses 71 and 72, the shared material 12 is displayed. Users, who operate the communication apparatus 30 and the partner apparatuses 71 and 72, respectively, participate in the remote conference while using the shared material 12 displayed on the communication apparatus 30 and the partner apparatuses 71 and 72. Hereinafter, the users who operate the partner apparatuses 71 and 72, respectively, and participate in the remote conference will be referred to as partners. Shared material data corresponding to the shared material 12 is transmitted and received between the conference server 20, and the communication apparatus 30 and the partner apparatuses 71 and 72. Sharing of the shared material data is performed by a material-sharing start process (see FIG. 6) to be described below. The shared material data is a data file having a file format.

Figure 3:
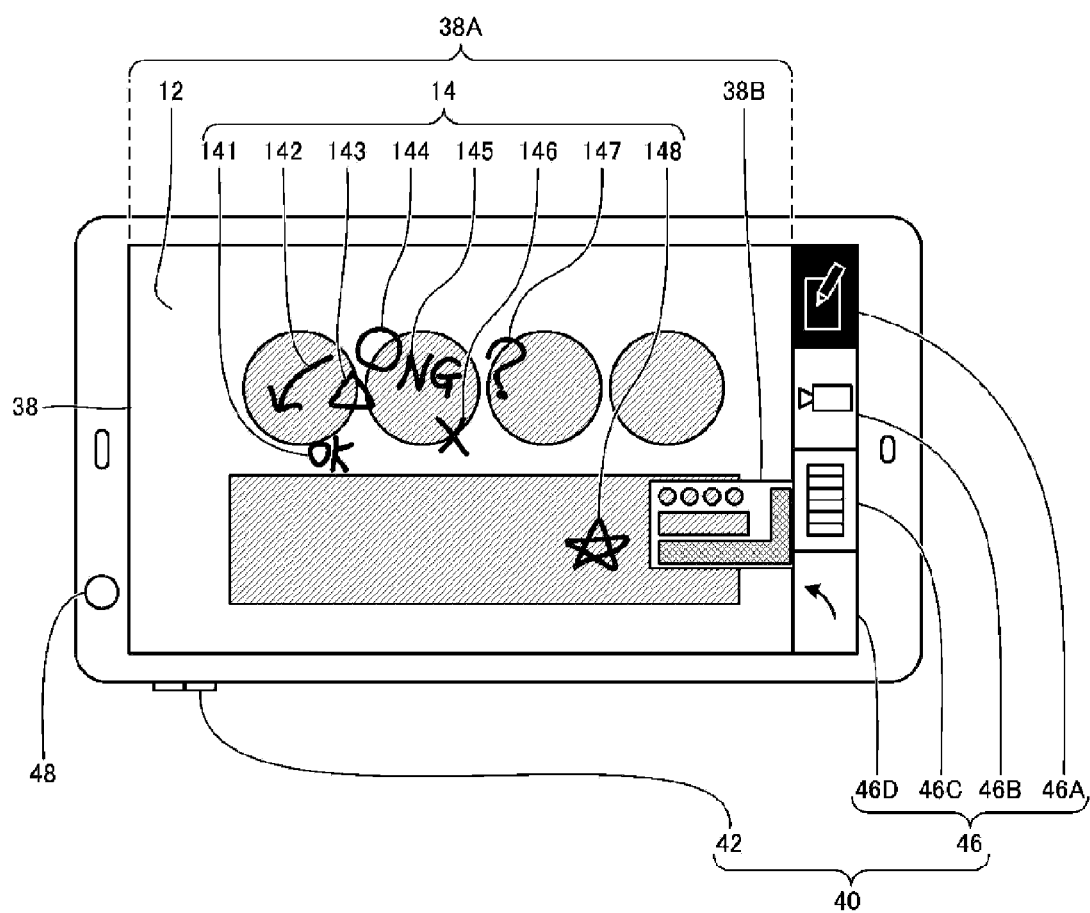
FIG. 3 is a view showing an example of a remote conference screen including a second display area in a first state.

The communication apparatus 30 and the partner apparatuses 71 and 72 can be used to input annotations 14 to the shared material 12 displayed on the communication apparatus 30 and the partner apparatuses 71 and 72. The annotations 14 are information which are displayed so as to be superimposed on the shared material 12. For example, the user of the communication apparatus 30 performs an annotation input operation, thereby inputting the annotations 14 by handwriting. The annotation input operation is an operation of drawing a line figure or the like, for example, by sliding a finger or a touch pen on a touch pad 44. In the communication apparatus 30, the input annotations 14 are displayed such that the annotations 14 are superimposed on the shared material 12 being displayed (see FIG. 3). In FIG. 3, eight annotations 141 to 148 are shown. If all annotations including the annotations 141 to 148 which are input to the shared material 12 are to be not distinguished from each other or are collectively referred to, the annotations are referred to as the annotations 14.

If the annotations 14 are input to the shared material 12 by the annotation input operation, the communication apparatus 30 obtains input positions where the annotations 14 are input to the shared material 12, and associates data representing the drawn annotations 14, and position information representing the input positions of the annotations 14, with the shared material 12, thereby generating annotation data. In the partner apparatuses 71 and 72, the same process is also performed. The annotation data generated by each terminal device of the communication apparatus 30 and the partner apparatuses 71 and 72 is transmitted to the other terminal devices through the conference server 20. When receiving the annotation data, the other terminal devices display the annotations 14 on the shared material 12 being displayed based on the annotation data. However, if a portion of the shared material 12 corresponding to an input position represented by the position information is set to a non-display state, a corresponding annotation 14 is not displayed.

<Communication Apparatus>

As shown in FIG. 1, the communication apparatus 30 includes a CPU 32, a storage unit 34, a RAM 36, a display 38, an operation device 40, a camera 48, the communication unit 50, and a clock unit 52. These units 32 to 52 are connected to a bus 54. The CPU 32 performs arithmetic processes. The storage unit 34 is configured by a computer-readable medium, for example, a flash memory. However, the storage unit 34 may be configured by a hard disk, a ROM, or the like. The storage unit 34 stores various programs. For example, an operating system (OS) and various applications are stored. The applications which are stored in the storage unit 34 include a program for performing respective processes (see FIGS. 4 to 10, FIG. 16, and FIGS. 18 to 20) to be described below. The program for performing the respective processes to be described below may be installed in the storage unit 34 in advance. Alternatively, when the communication apparatus 30 accesses the conference server 20 on the occasion of participating in a remote conference, the program may be transmitted as a transmission signal from the conference server 20 to the communication apparatus 30 through the network 90 and be installed in the storage unit 34 at that timing. In this case, the program may be stored in the RAM 36.

The advance installation can be performed, for example, by reading the program stored in a computer-readable storage medium such as an optical medium or a semiconductor memory, by a reading unit (not shown) of the communication apparatus 30. Alternatively, the advance installation may be performed by receiving the program stored in a computer-readable storage medium such as a hard disk of a server (the conference server 20 or a server (not shown)) connected to the communication apparatus 30 through the network 90, as a transmission signal through the communication unit 50 of the communication apparatus 30. The way of installation can be appropriately determined in view of various circumstances. Also, the computer-readable storage medium may not include a signal to be transitorily transmitted. The computer-readable storage medium may be a non-transitory storage medium. The non-transitory storage medium does not include a transitory signal. The non-transitory storage medium needs only to be a recording medium allowing information to be recorded regardless of the storage period of the information. In the storage unit 34, a third evaluation value table (see FIG. 13) and an operability table (see FIG. 15) to be described below are stored.

The RAM 36 serves as a storage area which is used when the CPU 32 executes various programs. The RAM 36 stores predetermined data and information which are used in the process. The CPU 32 controls the communication apparatus 30, for example, by executing the OS and the programs stored in the storage unit 34. As a result, in the communication apparatus 30, various processes are performed, whereby various functional units are implemented.

The display 38 displays various information. For example, in the display 38, a remote conference screen is displayed (see FIGS. 2 and 3). The remote conference screen includes display items relating to the remote conference. The remote conference screen includes the capture images 380, 381 and 382, the shared material 12 and the annotations 14 described above, as display items relating to the remote conference. Hereinafter, an area of the remote conference screen where the shared material 12 is displayed will be referred to as a first display area 38A. The remote conference screen includes the above-described capture images 380, 381 and 382 within the first display area 38A. In the communication apparatus 30, it is possible to appropriately select whether to display the capture images 380, 381 and 382.

The operation device 40 receives input of various commands and the like relating to the communication apparatus 30. The operation device 40 includes, for example, a hard key 42 and the touch pad 44. The touch pad 44 is, for example, an electrostatic capacitance type position input device, and outputs a signal representing a coordinate position according to the contact position of a finger of the user. The touch pad 44 may be configured by a position input device of any other type such as a resistive film type or an ultrasonic type. The display 38 and the touch pad 44 configure a touch panel (see a broken line surrounding the display 38 and the touch pad 44 in FIG. 1). In the display 38, software keys 46 using the touch panel are displayed (see FIGS. 2 and 3). The software keys 46 configure the operation device 40. Examples of the software keys 46 may include an annotation key 46A, a camera key 46B, a sharing key 46C, and a return key 46D. The user of the communication apparatus 30 performs operations such as tapping, dragging, flicking, pinch-in, and pinch-out with respect to the touch pad 44. The user of the communication apparatus 30 moves a finger or the like touched on the touch pad 44 in a predetermined direction, and performs each operation as described above. A control technique based on each operation as described above, and a handwriting input technique based on the above-described annotation input operation are used also in known smart phones or tablet terminals. The communication apparatus 30 employs those known techniques. The operation device 40 may include a keyboard and a mouse. In a case where the communication apparatus 30 is a personal computer, the operation device 40 includes, for example, a keyboard and a mouse.

The camera 48 captures an outside image. Specifically, the camera 48 captures an outside image including the user of the communication apparatus 30, who exists in front of the communication apparatus 30. Therefore, the outside image captured by the camera 48 becomes the above-described capture image 380. In the communication apparatus 30, with start of the remote conference, image capturing by the camera 48 is started, and capture image data corresponding to the capture image 380 is generated. The generated capture image data is video data of a predetermined frame rate (for example, 30 fps). The communication unit 50 connects the communication apparatus 30 to the network 90, and performs data communication through the network 90. For example, the capture image data generated with the start of the remote conference is transmitted from the communication unit 50 to the conference server 20, and is transmitted to each of the partner apparatuses 71 and 72 through the conference server 20. The clock unit 52 has a calendar function and a clock function, and measures a time. The clock unit 52 may be configured by the clock function of the OS. The communication apparatus 30 is different from a known portable terminal in that the program of the processes to be described below is stored in the storage unit 34. However, the communication apparatus 30 may be the same device as a known portable terminal in terms of hardware.

<Application Process>

Figure 4:
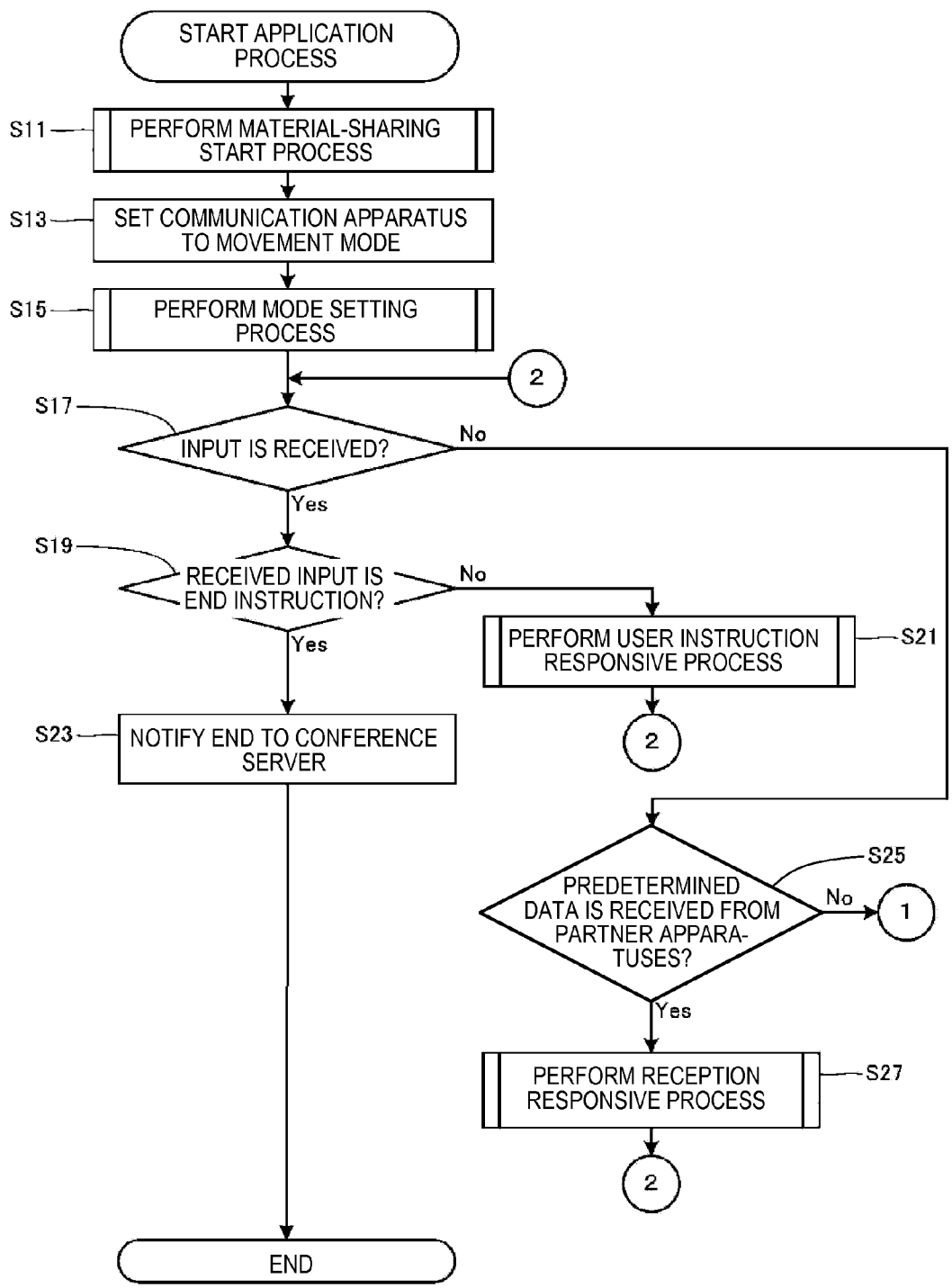
FIG. 4 is a flow chart of a first portion of an application process.

An application process which is performed by the communication apparatus 30 in the remote conference with the partner apparatuses 71 and 72 through the conference server 20 will be described with reference to FIGS. 4 and 5. In the remote conference system 10, for example, before the scheduled date and time of the remote conference, an electronic mail is transmitted from the conference server 20 to an electronic mail address corresponding to each of the communication apparatus 30 and the partner apparatuses 71 and 72 scheduled to participate in the remote conference. This electronic mail includes a uniform resource locator (URL) for the remote conference to be performed by the communication apparatus 30 and the partner apparatuses 71 and 72. This URL is unique for each conference room of the remote conference. In other words, the URL includes the conference ID of the remote conference. The user of the communication apparatus 30 operates the communication apparatus 30 at the scheduled date and time of the remote conference. The communication apparatus 30 accesses the conference server 20 based on the above described URL, and a remote conference session is established between the communication apparatus 30 and the conference server 20. The conference server 20 holds the conference ID included in the URL, and the identification information of the communication apparatus 30 in association with each other. The same operation is performed in the partner apparatuses 71 and 72, and a remote conference session is established between the conference server 20 and each of the partner apparatuses 71 and 72. As a result, the remote conference by the communication apparatus 30 and the partner apparatuses 71 and 72 is started.

In a state where the remote conference has been started, and data such as capture image data has been already transmitted and received between the conference server 20 and each terminal device of the communication apparatus 30 and the partner apparatuses 71 and 72, the application process is started. When starting the application process, the CPU 32 performs a material-sharing start process in Step S11. The material-sharing start process will be described below. After the material-sharing start process is performed, in Step S13, the CPU 32 sets the communication apparatus 30 to a movement mode. Specifically, the CPU 32 stores set information representing that the communication apparatus 30 is set to the movement mode, in the RAM 36. The movement mode is a mode in which an operation, such as dragging or flicking, on the touch pad 44 is received as an input for moving (changing) a portion of the shared material 12 being displayed in the first display area 38A to another portion. In the movement mode, annotations 14 cannot be input. Subsequently, in Step S15, the CPU 32 performs a mode setting process. The mode setting process will be described below. After the mode setting process is performed, in Step S17, the CPU 32 determines whether any input (including an input based on an operation on the touch pad 44) is received by the operation device 40. If the operation device 40 receives an input ("YES" in Step S17), in Step S19, the CPU 32 determines whether the input received by the operation device 40 is an end instruction. The end instruction is input, for example, by pressing the return key 46D (see FIGS. 2 and 3) associated with the end instruction.

If the input received by the operation device 40 is not an end instruction ("NO" in Step S19), in Step S21, the CPU 32 performs a user instruction responsive process. The user instruction responsive process will be described below. After the user instruction responsive process is performed, the CPU 32 returns the process to Step S17, and performs the processes of Step S17 and the subsequent Steps. If the input received by the operation device 40 is an end instruction ("YES" in Step S19), in Step S23, the CPU 32 notifies the end to the conference server 20. Specifically, the CPU 32 transmits an end notification from the communication unit 50 to the conference server 20. Thereafter, the CPU 32 ends the application process. The conference server 20 receives the end notification transmitted in Step S23. Thereafter, a process to end the remote conference session is appropriately performed between the communication apparatus 30 and the conference server 20. With end of the session, the CPU 32 ends performance of the remote conference.

Returning to the description of Step S17, if the operation device 40 does not receive any input ("NO" in Step S17), in Step S25, the CPU 32 determines whether predetermined data transmitted from the partner apparatuses 71 and 72 through the conference server 20 is received by the communication unit 50. If the predetermined data is received by the communication unit 50 ("YES" in Step S25), in Step S27, the CPU 32 performs a reception responsive process. The reception responsive process will be described below. After the reception responsive process is performed, the CPU 32 returns the process to Step S17, and performs the processes of Step S17 and the subsequent Steps.

Figure 5:
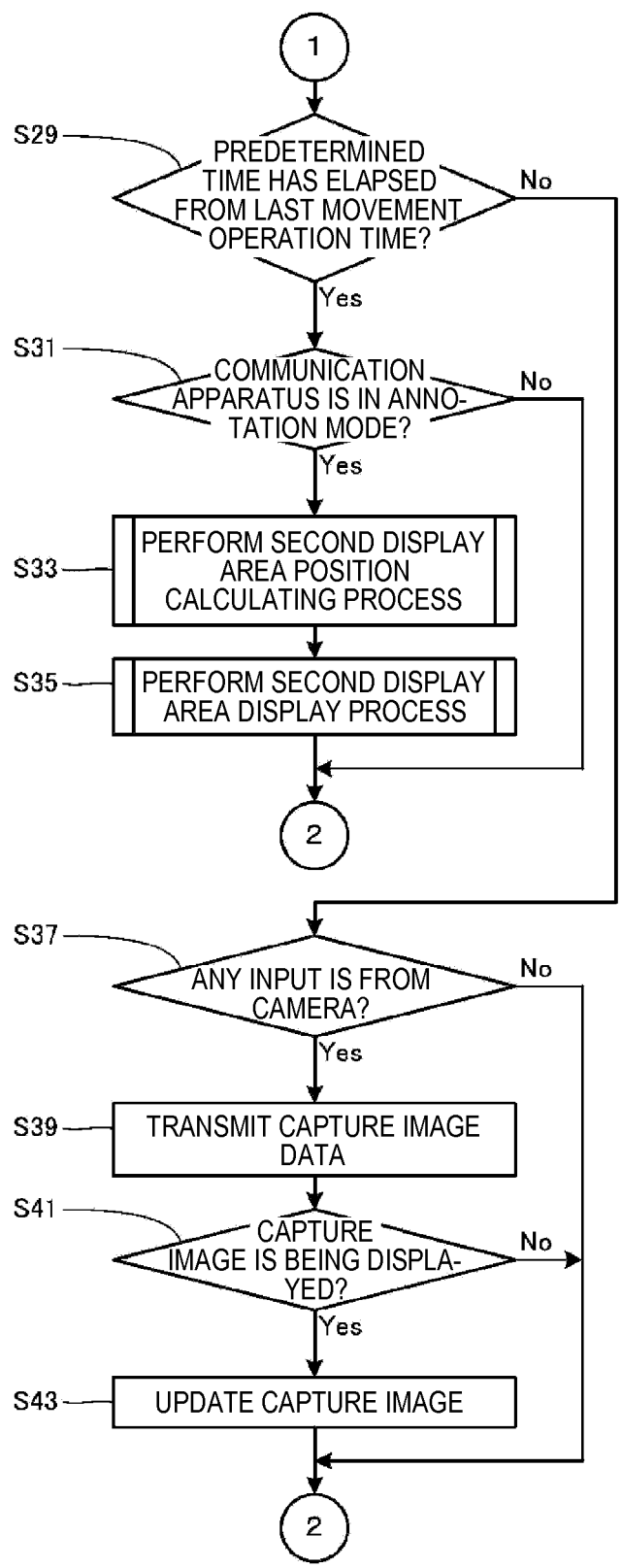
FIG. 5 is a flow chart of a second portion of the application process.

If the predetermined data is not received by the communication unit 50 ("NO" in Step S25), the CPU 32 advances the process to Step S29 of FIG. 5 in which the CPU 32 determines whether a predetermined time has elapsed from a last movement operation time. The last movement operation time is stored in Step S175 of a remote conference screen operating process (FIG. 18) to be described below. The predetermined time is appropriately determined in view of various circumstances. If the predetermined time has elapsed from the last movement operation time ("YES" in Step S29), in Step S31, the CPU 32 determines whether the communication apparatus 30 is set to an annotation mode, with reference to the set information of the RAM 36. The annotation mode is a mode in which an operation on the touch pad 44 is received as an annotation input operation. In the annotation mode, the annotations 14 can be input to the shared material 12 displayed in the first display area 38A. If the communication apparatus 30 is not in the annotation mode ("NO" in Step S31), the CPU 32 returns the process to Step S17 of FIG. 4, and performs the processes of Step S17 and the subsequent Steps. If the communication apparatus 30 is in the movement mode, the determination result of Step S31 becomes negative ("NO" in Step S31). If the communication apparatus 30 is in the annotation mode ("YES" in Step S31), the CPU 32 performs a second display area position calculating process in Step S33, and thereafter performs a second display area display process in Step S35. The second display area position calculating process and the second display area display process will be described below. After the second display area display process is performed, the CPU 32 returns the process to Step S17 of FIG. 4, and performs the processes of Step S17 and the subsequent Steps.

If the predetermined time has not elapsed from the last movement operation time ("NO" in Step S29), in Step S37, the CPU 32 determines whether there is any input from the camera 48. As described above, the frame rate of capture image data based on image capturing by the camera 48 is, for example, about 30 fps. If the frame rate is 30 fps, input from camera 48 is repeated in a unit of 1/30 second. If the time of Step S37 is a timing between frames, and thus there is no input from the camera 48 ("NO" in Step S37), the CPU 32 returns the process to Step S17 of FIG. 4, and performs the processes of Step S17 and the subsequent Steps. If there is an input from the camera 48 ("YES" in Step S37), in Step S39, the CPU 32 transmits the input capture image data from the communication unit 50. The capture image data is transmitted from the communication unit 50 to the partner apparatuses 71 and 72 through the conference server 20.

Subsequently, in Step S41, the CPU 32 determines whether the capture images 380, 381 and 382 are being displayed. Whether to display the capture images 380, 381 and 382 is set in Step S101 (display) or Step S105 (non-display) of the user instruction responsive process (see FIG. 8 for the details) to be described below. If the capture images 380, 381 and 382 are not being displayed ("NO" in Step S41) (see FIG. 3), the CPU 32 returns the process to Step S17 of FIG. 4, and performs the processes of Step S17 and the subsequent Steps. If the capture images 380, 381 and 382 are being displayed ("YES" in Step S41) (see FIG. 2), in Step S43, the CPU 32 outputs an instruction for updating the capture image 380 of the capture images 380, 381 and 382 with a newly input capture image 380, to the display 38. For updating of the capture image 380, capture image data input from the camera 48 (see "YES" in Step S37) is used. In the display 38, the new capture image 380 is displayed. Thereafter, the CPU 32 returns the process to Step S17 of FIG. 4, and performs the processes of Step S17 and the subsequent Steps.

<Material-Sharing Start Process>

Figure 6:
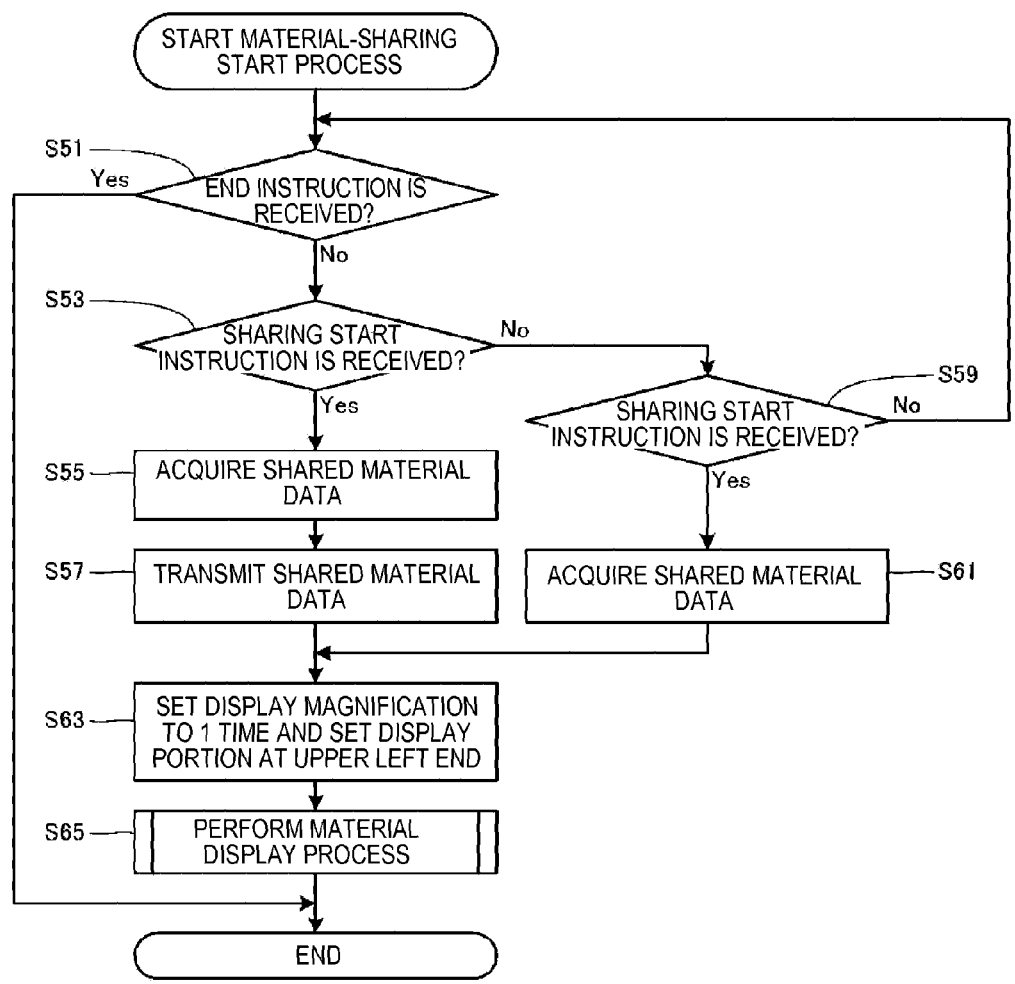
FIG. 6 is a flow chart of a material-sharing start process.

The material-sharing start process which is performed in Step S11 of FIG. 4 will be described with reference to FIG. 6. In Step S51, the CPU 32 determines whether the operation device 40 receives an instruction for ending the material-sharing start process. For example, an instruction for ending the material-sharing start process is input by pressing the return key 46D as described above. If the operation device 40 receives an instruction for ending the material-sharing start process ("YES" in Step S51), the CPU 32 ends the material-sharing start process. If the operation device 40 does not receive any instruction for ending the material-sharing start process ("NO" in Step S51), in Step S53, the CPU 32 determines whether the operation device 40 receives a sharing start instruction. The sharing start instruction is input, for example, by pressing the sharing key 46C associated with sharing start (see FIGS. 2 and 3).

If the sharing key 46C is pressed, whereby the operation device 40 receives a sharing start instruction ("YES" in Step S53), in Step S55, the CPU 32 acquires the shared material data. After pressing the sharing key 46C, the user of the communication apparatus 30 designates, for example, predetermined data of the data stored in the storage unit 34, as the shared material data which is a sharing object. That is, if the sharing key 46C is pressed, for example, the CPU 32 displays a list of data stored in a predetermined storage area of the storage unit 34 on the display 38. The user of the communication apparatus 30 designates predetermined data to be the shared material 12, for example, by tapping a desired data portion. In Step S55, the CPU 32 acquires the designated predetermined data as the shared material data. Subsequently, in Step S57, the CPU 32 transmits the acquired shared material data from the communication unit 50 to the conference server 20. The shared material data is transmitted from the conference server 20 to the partner apparatuses 71 and 72.

If the sharing key 46C is not pressed, and thus, the operation device 40 does not receive a sharing start instruction ("NO" in Step S53), in Step S59, the CPU 32 determines whether the sharing start instruction transmitted from the conference server 20 is received by the communication unit 50. If the conference server 20 receives material data transmitted from any one of the communication apparatus 30 and the partner apparatuses 71 and 72, the conference server 20 transmits a sharing start instruction to the other apparatuses participating in the remote conference except for the transmission source. If a sharing start instruction is not received ("NO" in Step S59), the CPU 32 returns the process to Step S51, and performs the processes of Step S51 and the subsequent Steps. If a sharing start instruction is received ("YES" in Step S59), in Step S61, the CPU 32 acquires shared material data from any one of the partner apparatuses 71 and 72 transmitted from the conference server 20. The shared material data is transmitted by the communication unit 50. The CPU 32 acquires the shared material data through the communication unit 50.

After Step S57 or S61 is performed, in Step S63, the CPU 32 sets a display magnification to same magnification (that is, the display magnification is 100%), with respect to display of the shared material 12 corresponding to the acquired shared material data, on the display 38, and sets a display position at the upper left end. That is, in a state where the upper left end of the shared material 12 is aligned with the upper left end of the display 38, the shared material 12 corresponding to the shared material data is displayed. The CPU 32 stores range information representing a range of the entire shared material 12 displayed in the display 38, in the RAM 36. Subsequently, in Step S65, the CPU 32 performs a material display process. The material display process will be described below. After performing the material display process, the CPU 32 ends the material-sharing start process.

<Mode Setting Process>

The mode setting process which is performed in Step S15 of FIG. 4 and Step S93 of FIG. 8 (to be described below) will be described with reference to FIG. 7. In Step S71, the CPU 32 determines whether the communication apparatus 30 is set to the annotation mode, with reference to the set information of the RAM 36. If the communication apparatus 30 is in the annotation mode ("YES" in Step S71), in Step S73, the CPU 32 sets an annotation input area to the entire first display area 38A. The annotation input area is an area for receiving input of the annotations 14. In Step S75, the CPU 32 validates the annotation input area set in Step S73. Subsequently, the CPU 32 performs a second display area position calculating process in Step S77, and then performs a second display area display process in Step S79. The second display area position calculating process and the second display area display process will be described below.

If the communication apparatus 30 is not in the annotation mode ("NO" in Step S71), in Step S81, the CPU 32 invalidates the annotation input area. In Step S83, the CPU 32 sets a movement input area to the entire first display area 38A. The movement input area is an area for receiving an input for moving (changing) a portion of the shared material 12 being displayed in the first display area 38A, to another portion. As will be described below in detail, the movement input area when the communication apparatus 30 is in the annotation mode is referred to as a second display area 38B (see FIGS. 3 and 17). The second display area 38B is set to an area having an area smaller than that of the first display area 38A. After performing Step S79 or S83, the CPU 32 ends the mode setting process.

<User Instruction Responsive Process>

The user instruction responsive process which is performed in Step S21 of FIG. 4 will be described with reference to FIG. 8. In Step S91, the CPU 32 determines whether the input which is received by the operation device 40 and is a cause of positive result in Step S17 of FIG. 4 ("YES" in Step S17) is an input for instructing mode switching. Mode switching is input by pressing of the annotation key 46A (see FIGS. 2 and 3). For example, the CPU 32 determines whether the input received by the operation device 40 is an input on the touch pad 44 and corresponds to the position of the annotation key 46A. If the annotation key 46A (see FIG. 2) in an unselected state is pressed, the CPU 32 stores set information representing that the communication apparatus 30 is set to the annotation mode, in the RAM 36. The CPU 32 outputs an instruction for switching the annotation key 46A to a selected state, to the display 38. In the display 38, the annotation key 46A is switched to the selected state (see FIG. 3). If the annotation key 46A in the selected state is pressed, the CPU 32 stores set information representing that the communication apparatus 30 is set to the movement mode, in the RAM 36. The CPU 32 outputs an instruction for switching the annotation key 46A to the unselected state, to the display 38. In the display 38, the annotation key 46A is switched to the unselected state.

Figure 7:
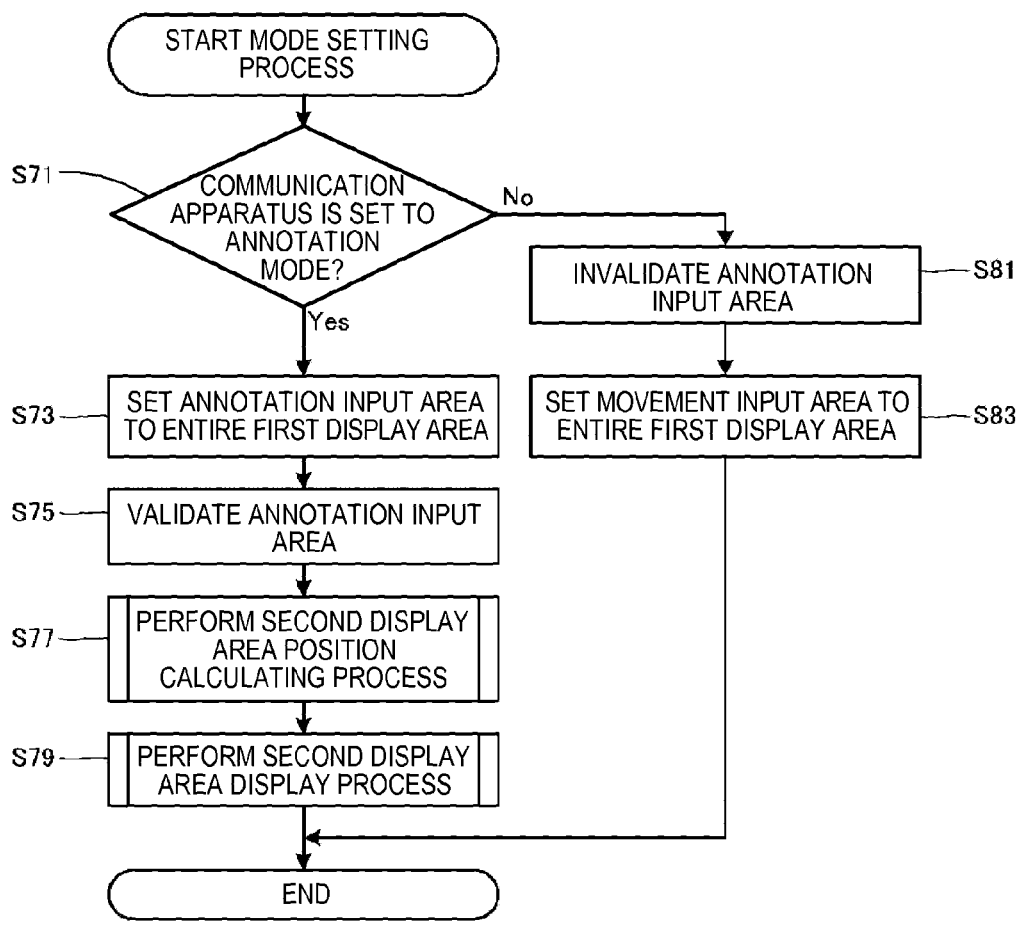
FIG. 7 is a flow chart of a mode setting process.
Figure 8:
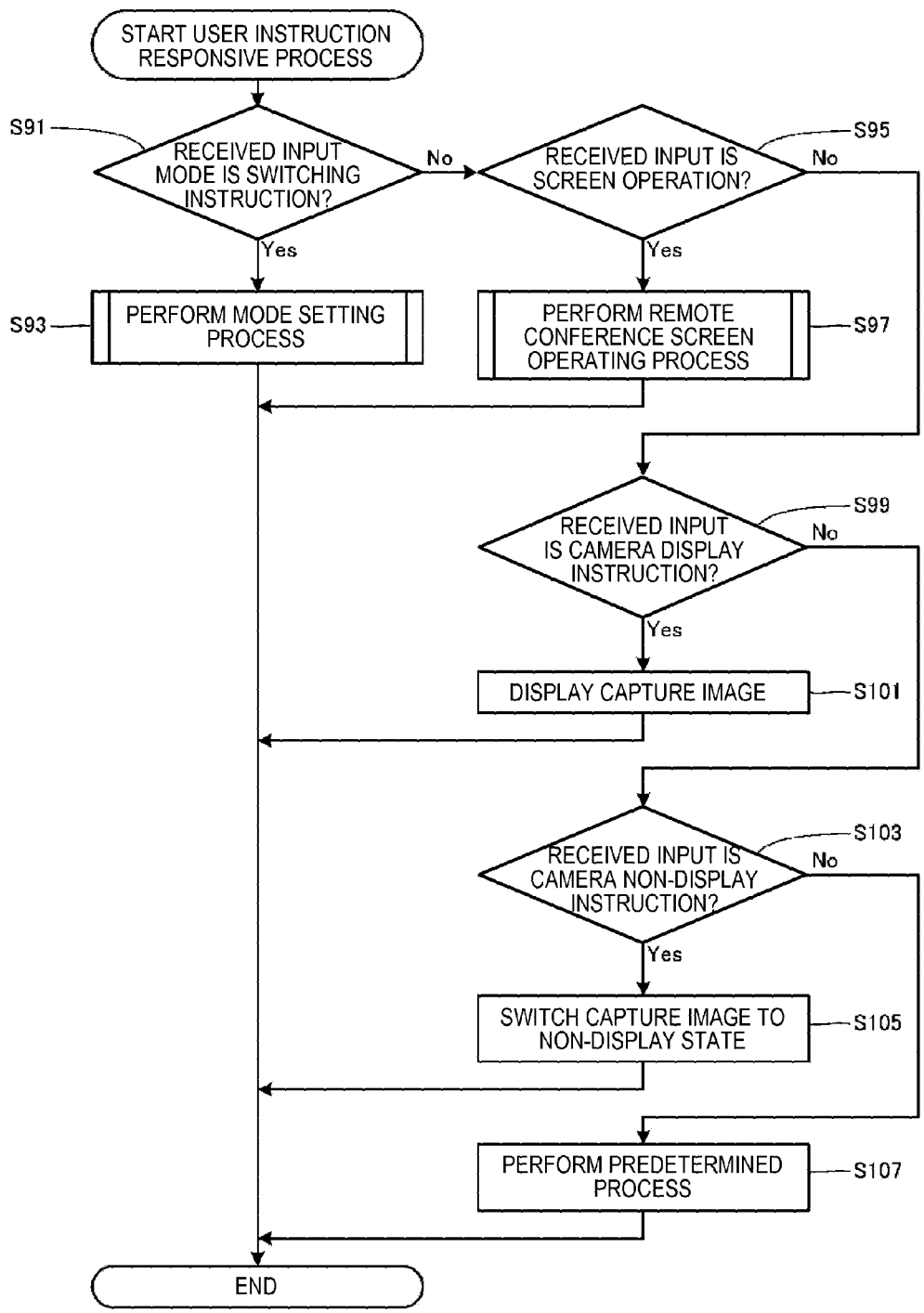
FIG. 8 is a flow chart of a user instruction responsive process.

If the input received by the operation device 40 is an input for instructing mode switching ("YES" in Step S91), in Step S93, the CPU 32 performs the above-described mode setting process (see FIG. 7). If the input received by the operation device 40 is not an input for instructing mode switching ("NO" in Step S91), in Step S95, the CPU 32 determines whether the input received by the operation device 40 is a screen operation on the remote conference screen. For example, the CPU 32 determines whether the input received by the operation device 40 is an input on the touch pad 44 and corresponds to the position of the first display area 38A or the second display area 38B. The CPU 32 performs this determination based on a signal representing a coordinate position according to the contact position of a user's finger with the touch pad 44. As the screen operation, the above-described annotation input operation can be exemplified. Also, a material movement operation and a display magnification change operation can be exemplified as the screen operation. The material movement operation is an operation for moving (changing) a portion of the shared material 12 being displayed in the first display area 38A, to another portion. Specifically, dragging, flicking, or the like on the touch pad 44 corresponds to the material movement operation. The display magnification change operation is an operation for changing the display magnification of the shared material 12 being displayed in the first display area 38A. Specifically, pinch-in or pinch-out on the touch pad 44 corresponds to the display magnification change operation. If the input received by the operation device 40 is a screen operation on the remote conference screen ("YES" in Step S95), in Step S97, the CPU 32 performs a remote conference screen operating process. The remote conference screen operating process will be described below.

If the input received by the operation device 40 is not a screen operation ("NO" in Step S95), in Step S99, the CPU 32 determines whether the input received by the operation device 40 is a camera display instruction. For example, the CPU 32 determines whether the input received by the operation device 40 is an input on the touch pad 44 and corresponds to the position of the camera key 46B. The camera display instruction is an instruction for displaying the capture images 380, 381 and 382 and is input by pressing of the camera key 46B. In order to display the capture images 380, 381 and 382, the user of the communication apparatus 30 presses the camera key 46B (see FIG. 3) in an unselected state. If the camera key 46B in the unselected state is pressed, the CPU 32 determines that a camera display instruction is received ("YES" in Step S99). In this case, in Step S101, the CPU 32 outputs an instruction for displaying the capture images 380, 381 and 382 in the first display area 38A. In response to this instruction output, the CPU 32 stores information representing that the capture images 380, 381 and 382 are being displayed in the first display area 38A, in the RAM 36. At that time, the CPU 32 also outputs an instruction for switching the camera key 46B to a selected state, to the display 38. In the display 38, the capture images 380, 381 and 382 are displayed, and the camera key 46B is switched to the selected state (see FIG. 2). If a display size change operation is performed to each of the capture images 380, 381 and 382 displayed in the remote conference screen, the CPU 32 accordingly changes the display size of a capture image which is the operation object among the capture images 380, 381 and 382. The display size change operation is an operation for changing the display size of any one of the capture images 380, 381 and 382.

If the input received by the operation device 40 is not a camera display instruction ("NO" in Step S99), in Step S103, the CPU 32 determines whether the input received by the operation device 40 is a camera non-display instruction. For example, the CPU 32 determines whether the input received by the operation device 40 is an input on the touch pad 44 and corresponds to the position of the camera key 46B. The camera non-display instruction is an instruction for switching the capture images 380, 381 and 382 to a non-display state, and is input by pressing of the camera key 46B, similarly to the camera display instruction. In order to switch the capture images 380, 381 and 382 to the non-display state, the user of the communication apparatus 30 presses the camera key 46B (see FIG. 2) in the selected state. If the camera key 46B in the selected state is pressed, the CPU 32 determines that a camera non-display instruction is received ("YES" in Step S103). In this case, in Step S105, the CPU 32 outputs an instruction for switching the capture images 380, 381 and 382 being displayed in the first display area 38A, to the non-display state. In response to this instruction output, the CPU 32 stores information representing that the capture images 380, 381 and 382 are not being displayed in the first display area 38A, in the RAM 36. At that time, the CPU 32 also outputs an instruction for switching the camera key 46B to the unselected state, to the display 38. In the display 38, the capture images 380, 381 and 382 are switched to the non-display state, and the camera key 46B is switched to the unselected state (see FIG. 3).

If the input received by the operation device 40 is not a camera non-display instruction ("NO" in Step S103), in Step S107, the CPU 32 performs a predetermined process corresponding to the input received by the operation device 40. For example, if the input received by the operation device 40 is a display size change operation to the capture image 380, the CPU 32 outputs an instruction for magnifying the capture image 380 to a display size according to the operation, to the display 38. In the display 38, the capture image 380 being displayed is magnified to the display size according to that instruction and is displayed. After performing Step S93, S97, S101, S105, or S107, the CPU 32 ends the user instruction responsive process.

<Reception Responsive Process>

Figure 9:
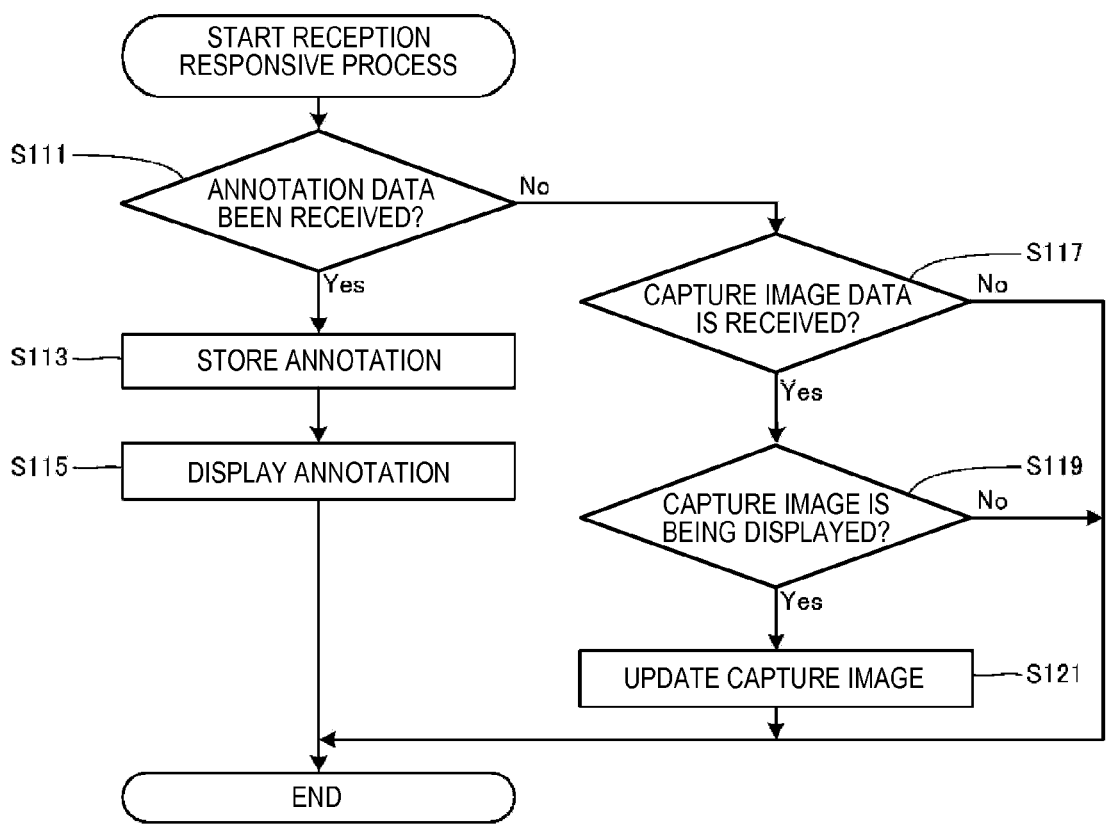
FIG. 9 is a flow chart of a reception responsive process.

The reception responsive process which is performed in Step S27 of FIG. 4 will be described with reference to FIG. 9. In the reception responsive process, processes are performed to data which is received by the communication unit 50 and is a cause of the positive result of Step S25 of FIG. 4 ("YES" in Step S25). In Step S111, the CPU 32 determines whether the data received by the communication unit 50 is annotation data. If the data received by the communication unit 50 is annotation data ("YES" in Step S111), in Step S113, the CPU 32 stores the received annotation data. The annotation data is stored in the storage unit 34 or the RAM 36. Subsequently, in Step S115, the CPU 32 outputs an instruction for displaying an annotation 14 at a position represented by the position information included in the annotation data, to the display 38. In the display 38, the annotation 14 is displayed so as to be superimposed on the shared material 12 being displayed in the first display area 38A. However, in a case of determining that a portion of the shared material 12 corresponding to an input position represented by the position information is in the non-display state, with reference to range information stored in the RAM 36, the CPU 32 does not display the annotation 14.

If the data received by the communication unit 50 is not annotation data ("NO" in Step S111), in Step S117, the CPU 32 determines whether the data received by the communication unit 50 is capture image data from the partner apparatuses 71 and 72. If the data received by the communication unit 50 is capture image data ("YES" in Step S117), in Step S119, the CPU 32 determines whether the capture images 380, 381 and 382 are being displayed. Information representing display or non-display of the capture images 380, 381 and 382 is set in Step S101 (display) or Step S105 (non-display) of FIG. 8 described above, and is stored in the RAM 36. If the data received by the communication unit 50 is not capture image data ("NO" in Step S117), or if the capture images 380, 381 and 382 are not being displayed ("NO" in Step S119), the CPU 32 ends the reception responsive process.

If the capture images 380, 381 and 382 are being displayed ("YES" in Step S119), in Step S121, the CPU 32 outputs an instruction for updating the capture images 381 and 382 of the capture images 380, 381 and 382 with new capture images 381 and 382, to the display 38. For updating of the capture images 381 and 382, capture image data acquired respectively by the partner apparatuses 71 and 72 are used. In the display 38, the new capture images 381 and 382 are displayed. After performing Step S121, the CPU 32 ends the reception responsive process.

<Second Display Area Position Calculating Process>

Figure 2:
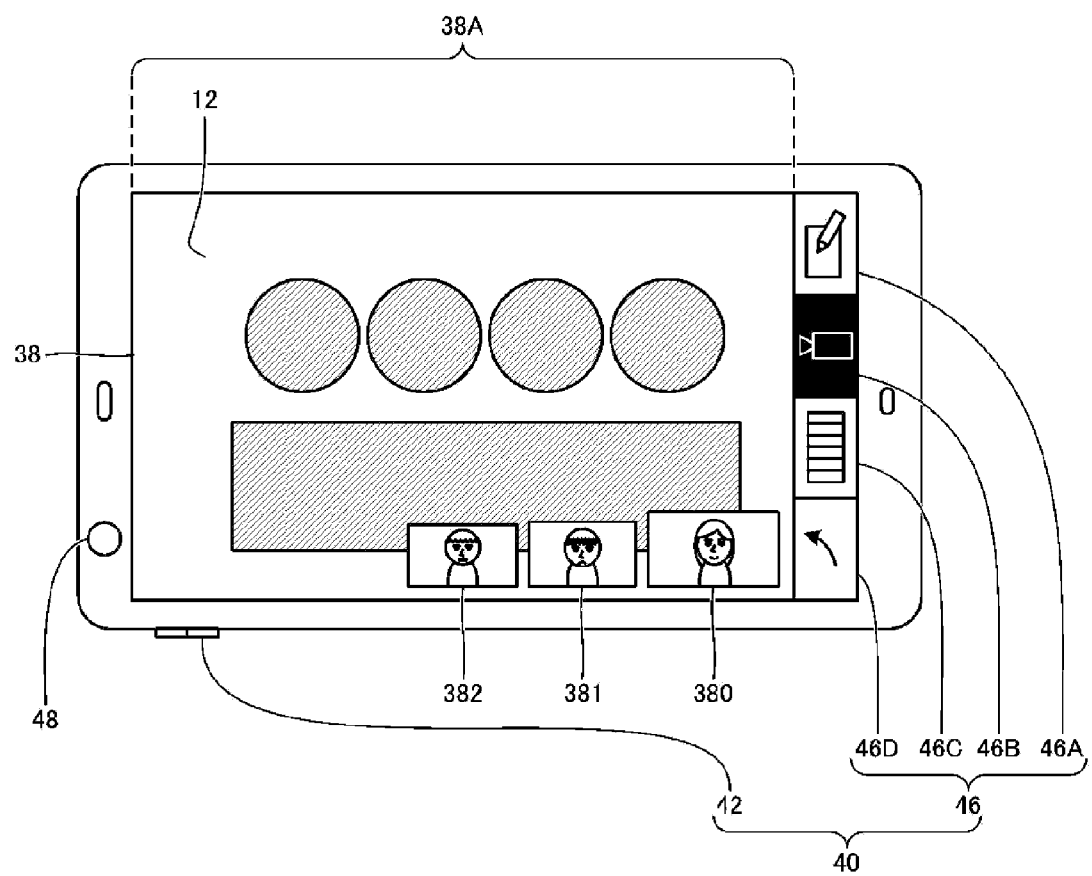
FIG. 2 is a view showing an example of a remote conference screen including captured images.

The second display area position calculating process which is performed in Step S33 of FIG. 5, Step S77 of FIG. 7, and Step S183 of FIG. 18 (to be described below) will be described with reference to FIG. 10. In Step S131, the CPU 32 determines whether the capture images 380, 381 and 382 are being displayed. Information representing display or non-display of the capture images 380, 381 and 382 is set in Step S101 (display) or Step S105 (non-display) of FIG. 8 described above, and is stored in the RAM 36. If the capture images 380, 381 and 382 are being displayed ("YES" in Step S131), in Step S133, the CPU 32 acquires the display position of the image on the display 38, which has the largest display seize among the capture images 380, 381 and 382. Referring to FIG. 2, in Step S133, the CPU 32 acquires the display position of the capture image 380 having the largest display size, on the display 38. If the display sizes of the capture images 380, 381 and 382 are the same, the CPU 32 selects a predetermined one. For example, the CPU 32 selects the capture image 380 of the communication apparatus 30, and acquires the display position of the capture image 380. Subsequently, in Step S135, the CPU 32 sets the acquired display position as the second display area 38B (see FIG. 17). Thereafter, the CPU 32 ends the second display area position calculating process.

Figure 11:
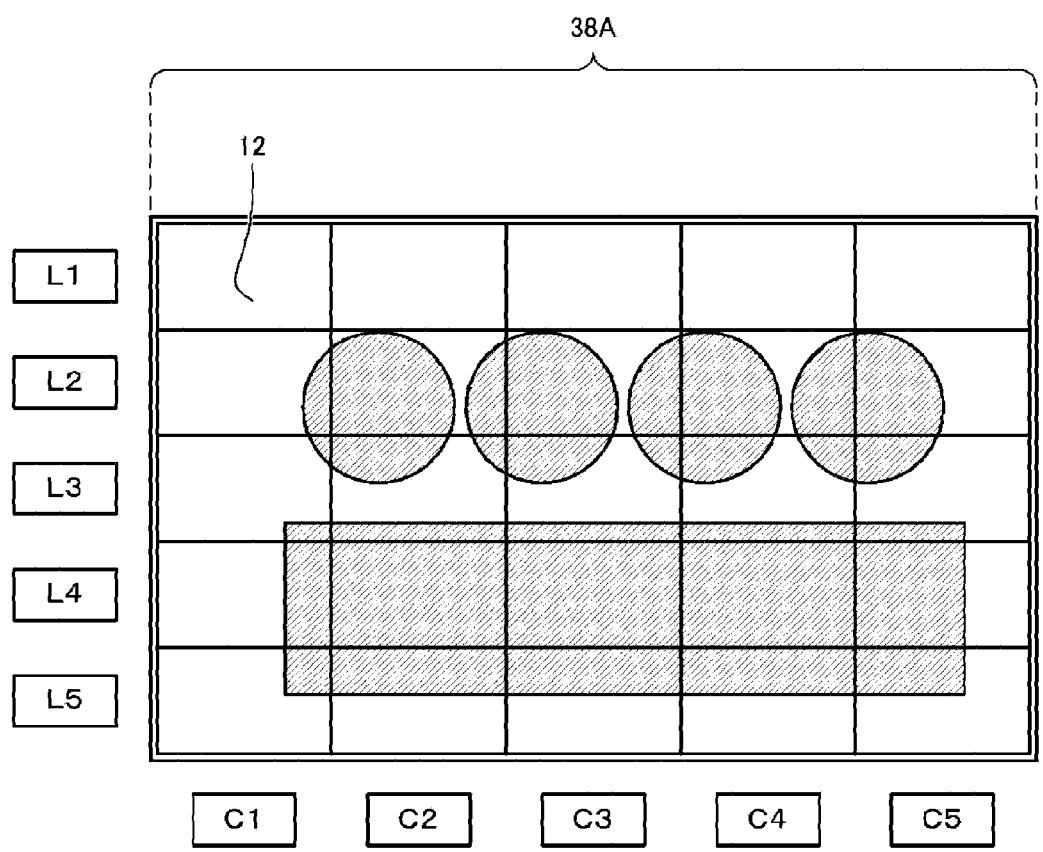
FIG. 11 is a view showing an example of a first display area and a plurality of sections obtained by dividing the first display area.

If the capture images 380, 381 and 382 are not being displayed ("NO" in Step S131), in Step S137, the CPU 32 divides the first display area 38A into a plurality of areas. For example, as shown in FIG. 11, the CPU 32 divides the first display area 38A into 25 areas (5 rows by 5 columns). Hereinafter, each of the areas obtained by dividing the first display area 38A will be referred to as a section, and a configuration in which the first display area 38A is divided into 25 sections will be described as an example. In FIG. 11, L1 to L5 and C1 to C5 shown at the outer periphery of the first display area 38A are information for specifying each of the sections arranged in a 5 rows by 5 columns matrix (This is the same in FIGS. 12 to 15 to be described below).

Subsequently, in Step S139, the CPU 32 acquires the position information of an attention point which receives attention in each of the partner apparatuses 71 and 72. In the remote conference by the remote conference system 10, remote conference screens including display items relating to the remote conference are also displayed on the displays of the partner apparatuses 71 and 72, respectively. The remote conference screens of the partner apparatuses 71 and 72 include display areas for displaying the shared material 12, and the partners of the partner apparatuses 71 and 72 can input annotations 14 with respect to the shared material 12, similarly in the communication apparatus 30. The position information of the attention point described above is information representing a certain position of the shared material 12 being displayed in a display area for displaying the shared material 12 in each of the partner apparatuses 71 and 72. As the position information of the attention point, position information representing the position of a pointer of each operation device (for example, a mouse) of the partner apparatuses 71 and 72 being displayed so as to be superimposed on the shared material 12 in the above described display area can be exemplified. Also, as the position information of the attention point, position information representing the input position of an annotation 14 input at the latest to the shared material 12 displayed in each of the partner apparatuses 71 and 72 can be exemplified. Further, as the position information of the attention point, position information representing a position presumed to be visibly recognized by each partner of the partner apparatuses 71 and 72 (for example, a center position of a portion of the shared material 12 being displayed in a display area for displaying the shared material 12) can be exemplified. Position information to be used as the position information of the attention point can be appropriately set in view of various conditions.

The partner apparatuses 71 and 72 transmit the position information of the attention point described above, to the conference server 20. In the communication apparatus 30, the communication unit 50 receives the position information of the attention point from each of the partner apparatuses 71 and 72 through the conference server 20, and the CPU 32 acquires the position information of each attention point of the partner apparatuses 71 and 72 through the communication unit 50. If the position information of the attention point is position information representing the input position of the annotation 14 input at the latest, the CPU 32 can acquire the above-described position information from the annotation data from the partner apparatuses 71 and 72.

Subsequently, in Step S141, the CPU 32 determines first evaluation values for the respective sections within the first display area 38A, based on the acquired position information of each attention point of the partner apparatuses 71 and 72. Each first evaluation value is determined based on a distance between a certain position represented by the position information of the attention point, and the position on the first display area 38A. The first evaluation values are determined such that a weighting factor becomes higher for a section closer to the position represented by the position information of the attention point. In other words, the first evaluation values become higher for a section closer to the position represented by the position information of the attention point.

Determination of the first evaluation values will be described in detail with reference to FIG. 12. In FIG. 12, and FIGS. 13 to 15 (to be described below), the shared material 12 is not shown. In FIGS. 12 to 15, the relation between a portion of the shared material 12 being displayed in the first display area 38A and each section is the same as that in FIG. 11. A symbol "○" denoted by a reference symbol "71P" in FIG. 12 represents a position represented by the position information of the attention point of the partner apparatus 71, and a symbol "X" denoted by a reference symbol "72P" in FIG. 12 represents a position represented by the position information of the attention point of the partner apparatus 72. Each section is specified by use of L1 to L5, and C1 to C5. For example, a section including "○" denoted by a reference symbol "71P" is disposed in a column C5 of a row L1, and this section is referred to as a section (L1•C5). A section including "X" denoted by a reference symbol "72P" is disposed in a column C4 of a row L2, and this section is referred to as a section (L2•C4).

In FIG. 12, "(X, Y, Z)" shown in association with "1:" within each section represents a first evaluation value based on the position information of each attention point of the partner apparatuses 71 and 72. "X" represents a first evaluation value (hereinafter, referred to as a first evaluation value (X)) based on the position information of the attention point of the partner apparatus 71, and "Y" represents a first evaluation value (hereinafter, referred to as a first evaluation value (Y)) based on the position information of the attention point of the partner apparatus 72. "Z" represents "X+Y" (hereinafter, referred to as a first evaluation value (Z)). In the example shown in FIG. 12, 2 points are given as a first evaluation value to the sections including the positions represented by the position information of the attention points, and 1 point is given as a first evaluation value to sections existing around the sections including the positions represented by the position information of the attention points. Therefore, the maximum value of the first evaluation values (X) and (Y) is "2", and the maximum value of the first evaluation values (Z) is "4".

In Step S141, the CPU 32 adds 2 to the first evaluation value (X) of the partner apparatus 71 at the section (L1•C5), according to the position represented by the position information of the attention point of the partner apparatus 71 acquired in Step S139. The CPU 32 adds 1 to the first evaluation value (X) of the partner apparatus 71 at each of sections (L1•C4), (L2•C4) and (L2•C5), according to the position represented by the position information of the attention point of the partner apparatus 71 acquired in Step S139. The sections (L1•C4), (L2•C4), and (L2•C5) are sections existing around the section (L1•C5).

Also, in Step S141, the CPU 32 adds 2 to the first evaluation value (Y) of the partner apparatus 72 of the section (L2•C4), according to the position represented by the position information of the attention point of the partner apparatus 72 acquired in Step S139. The CPU 32 adds 1 to the first evaluation value of the partner apparatus 72 of each of sections (L1•C3) to (L1•C5), (L2•C3), (L2•C5), and (L3•C3) to (L3•C5), according to the position represented by the position information of the attention point of the partner apparatus 72 acquired in Step S139. The sections (L1•C3) to (L1•C5), (L2•C3), (L2•C5), and (L3•C3) to (L3•C5) are sections existing around the section (L2•C4). Thereafter, the CPU 32 sums the first evaluation values (X) and (Y), thereby determining the first evaluation value (Z). The first evaluation value (Z) of each of the sections (L1•C5) and (L2•C4) becomes "3". The first evaluation value (Z) of each of the sections (L1•C4) and (L2•C5) becomes "2". The first evaluation value (Z) of each of the sections (L1•C3), (L2•C3), and (L3•C3) to (L3•C5) becomes "1". The first evaluation value (Z) of each of the other sections becomes "0".

A case where portions of the shared material 12 being displayed in the partner apparatuses 71 and 72, respectively, and a portion of the shared material 12 being displayed in the first display area 38A are different, and the portions of the shared material 12 being displayed in the partner apparatuses 71 and 72 are not being displayed in the communication apparatus 30 can also be assumed. In this case, the position information of the attention points of the partner apparatuses 71 and 72 is not included in any section. Therefore, in Step S141, in all sections, the first evaluation value (Z) is determined to "0".

After performing Step S141, in Step S143, the CPU 32 determines second evaluation values based on the positions of the annotations 14 in the first display area 38A. In Step S143, the CPU 32 acquires the number (quantity) of all annotations 14 (hereinafter, referred to as the total number of annotations) relating to the shared material 12, and specifies the input position of each annotation 14. Thereafter, the CPU 32 determines a point (hereinafter, referred to as a base point) per one annotation 14. The base point is determined by dividing a reference maximum point by the total number of annotations. In order to make the evaluation values of the first evaluation values (Z) and the second evaluation values the same as each other, the reference maximum point is determined to the same value as the maximum point of the first evaluation values (Z). Referring to the above described example, the reference maximum point is determined to "4".

Determination of the second evaluation values will be described in detail with reference to FIG. 12. The total number of annotations is set to "8" (see FIG. 3). In FIG. 12, with respect to "(X, Z)" shown in association with "2:" within each section, "X" represents the number of annotations input in each section, and "Z" represents a second evaluation value. Three of the eight annotations 14 are disposed in the section (L2•C2), and two of them are disposed in the section (L2•C3), and the other annotations are disposed in the sections (L3•C2), (L3•C3), and (L4•C4), respectively. The reference maximum point is set to "4". In Step S145, the CPU 32 acquires the total number "8" of annotations, and specifies the input position of each of the eight annotations 14. The input positions of the annotations 14 are specified according to the position information representing the input positions of the annotations 14. The CPU 32 specifies the number "3" of annotations in the section (L2•C2), and the number "2" of annotations in the section (L2•C3), and the number "1" of annotations in each of the sections (L3•C2), (L3•C3), and (L4•C4). Thereafter, the CPU 32 divides the reference maximum point "4" by the total number "8" of annotations, thereby acquiring the base point "0.5". The CPU 32 multiplies the specified numbers of annotations by the base point "0.5", thereby determining the second evaluation values for every section. The second evaluation value of the section (L2•C2) becomes "1.5" (=3 annotations×0.5). The second evaluation value of the section (L2•C3) becomes "1.0" (=2 annotations×0.5). The second evaluation value of each of the sections (L3•C2), (L3•C3), and (L4•C4) becomes "0.5" (=1 annotation×0.5). The second evaluation value of each of the other sections is "0".

Figure 13:
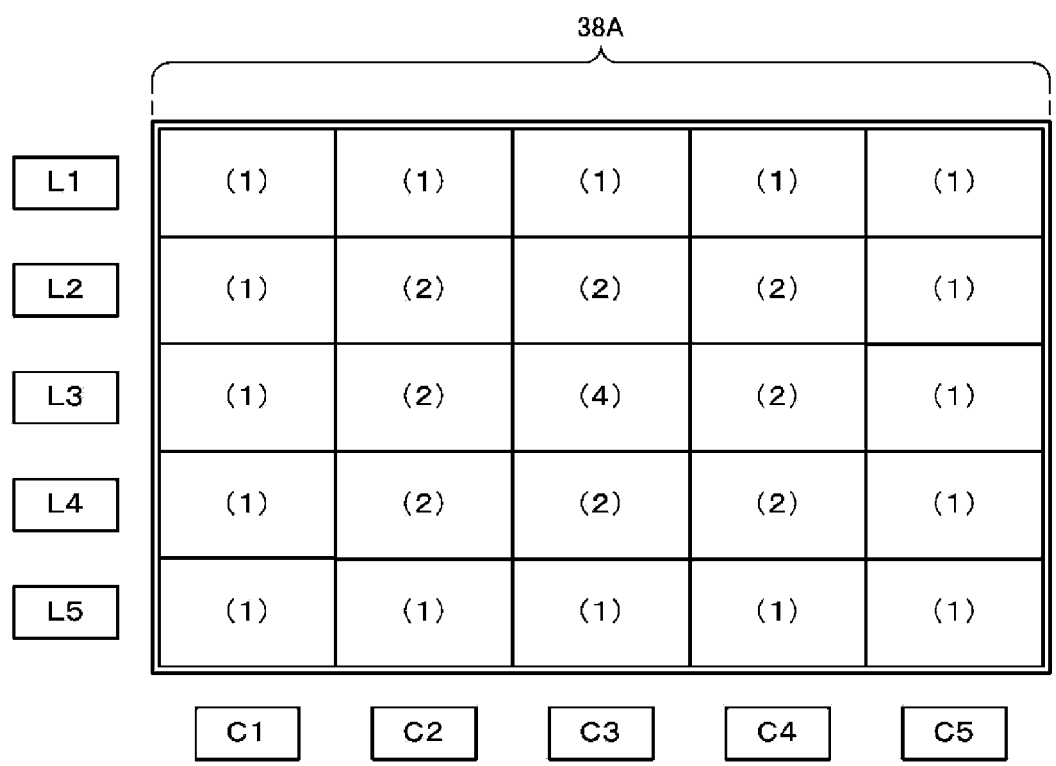
FIG. 13 is a view showing an example of a third evaluation value table.

After Step S143 is performed, in Step S145, the CPU 32 acquires a total evaluation value for each section. Each total evaluation value is acquired by adding a corresponding first evaluation value (Z) determined in Step S141, a corresponding second evaluation value determined in Step S143, and a corresponding third evaluation value. A third evaluation value is determined for each section in advance as shown in FIG. 13. A third evaluation value table having third evaluation values registered therein is stored in the storage unit 34. In Step S145, the CPU 32 accesses the third evaluation value table stored in the storage unit 34. In the third evaluation value table, the third evaluation values of the sections are set such that a weighting factor has become higher with respect to a section closer to the center of the first display area 38A. In other words, the third evaluation values become higher with respect to a section closer to the center of the first display area 38A. Therefore, the third evaluation value of the section (L3•C3) including the center position of the first display area 38A is set to be the highest. In order to make the assessment values of the first evaluation value (Z) and the second evaluation value, the third evaluation value of the section (L3•C3) is set to the same value as the maximum point of the first evaluation value (Z) and the second evaluation value. Therefore, in the example shown in FIG. 13, based on the above described example, the third evaluation value of the section (L3•C3) is set to "4".

Step S145 will be described in detail with reference to FIGS. 12 to 14. With respect to the same section, the CPU 32 adds the first evaluation value (Z), the second evaluation value, and the third evaluation value. For example, if the section (L1•C5) is exemplified, the CPU 32 adds the first evaluation value (Z) "3" (see FIG. 12), the second evaluation value "0" (see FIG. 12), and the third evaluation value "1" (see FIG. 13), thereby acquiring a total evaluation value "4" (see FIG. 14). With respect to every section, the CPU 32 performs the above described process, thereby acquiring total evaluation values. Referring to the example shown in FIGS. 12 and 13, the total evaluation value of the section (L3•C3) becomes "5.5" which is the maximum in all sections (see FIG. 14). Meanwhile, the total evaluation values of the sections (L1•C1), (L1•C2), (L2•C1), (L3•C1), (L4•C1), (L4•C5), and (L5•C1) to (L5•C5) become "1" which is the minimum (see FIG. 14).

Figure 15:
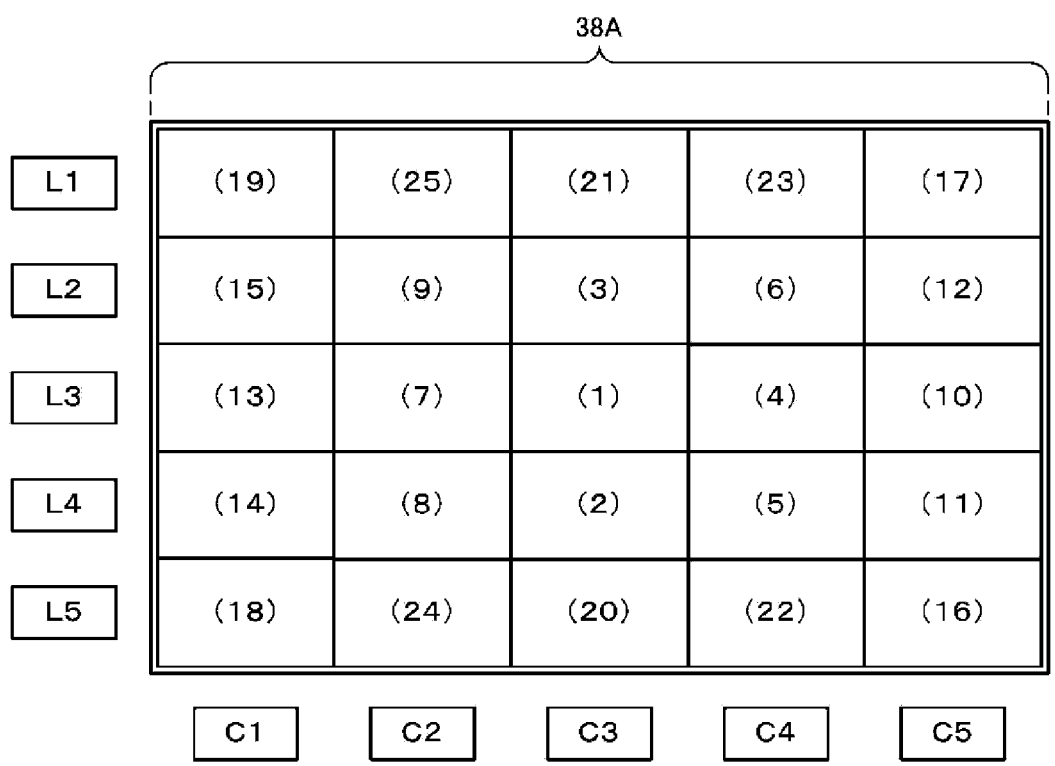
FIG. 15 is a view showing an example of an operability table.

Subsequently, in Step S147, with respect to the total evaluation values of the sections acquired in Step S145, the CPU 32 determines whether there is a plurality of sections having the minimum total evaluation value. In a case where there is not a plurality of sections having the minimum total evaluation value ("NO" in Step S147), in Step S149, the CPU 32 sets a section having the minimum total evaluation value, as the second display area 38B. In a case where there is a plurality of sections having the minimum total evaluation value ("YES" in Step S147), in Step S151, the CPU 32 sets a section, which is included in the sections having the minimum total evaluation value and has the best operability, as the second display area 38B. In order to specify a section having the best operability from the plurality of sections having the minimum total evaluation value, the CPU 32 accesses the operability table stored in the storage unit 34. The operability table is a table having evaluation values relating to operability registered for each section in advance as shown in FIG. 15. In the operability table shown in FIG. 15, a smaller evaluation value is registered for a section having better operability. That is, as the evaluation value decreases, the weighting factor relative to operability increases.

Step S151 will be described in detail with reference to FIGS. 14 and 15. After accessing the operability table, with respect to the sections (L1•C1), (L1•C2), (L2•C1), (L3•C1), (L4•C1), (L4•C5), and (L5•C1) to (L5•C5) having the minimum total evaluation value based on the total evaluation values shown in FIG. 14, the CPU 32 acquires evaluation values registered for those sections from the operability table. Subsequently, the CPU 32 specifies the section (L4•C5) (whose evaluation value is "11"), as a section having the minimum evaluation value of the acquired evaluation values. The CPU 32 sets the section (L4•C5) having the best operability, as the second display area 38B.

After performing Step S149 or S151, the CPU 32 ends the second display area position calculating process.

<Second Display Area Display Process>

The second display area display process which is performed in Step S35 of FIG. 5 and Step S79 of FIG. 7 will be described with reference to FIG. 16. In Step S161, the CPU 32 outputs an instruction for displaying a frame line representing the second display area 38B within the first display area 38A, according to the setting in Step S135, S149, or S151 of FIG. 10 described above, to the display 38. Subsequently, in Step S163, the CPU 32 determines the capture images 380, 381 and 382 are being displayed. Information representing display or non-display of the capture images 380, 381 and 382 is set in Step S101 (display) or Step S105 (non-display) of FIG. 8 described above, and is stored in the RAM 36.

If the capture images 380, 381 and 382 is not being displayed ("NO" in Step S163), in Step S165, the CPU 32 determines whether the display magnification of the shared material 12 being displayed in the first display area 38A is equal to or greater than a predetermined threshold value. As the threshold value, for example, 10 times (a display magnification of 1000%) is set. Changing of the display magnification of the shared material 12 is performed by the display magnification change operation as described above. Specifically, increasing of the display magnification is performed by pinch-out. The display magnification when the shared material 12 is being displayed at actual size according to the image size of the shared material data becomes 1 time (100%).

If the display magnification is equal to or greater than the threshold value ("YES" in Step S165), in Step S167, the CPU 32 outputs an instruction for displaying a thumbnail image corresponding to the shared material 12 being displayed in the first display area 38A, within the frame of the second display area 38B displayed in Step S161, to the display 38. In the display 38, the thumbnail image of the shared material 12 is displayed within the frame of the second display area 38B being displayed. As a result, the second display area 38B including the thumbnail image is displayed (see FIG. 3). The thumbnail image makes it possible to grasp the shared material 12. Also, FIG. 3 shows a remote conference screen in a state where the section (L4•C5) is set as the second display area 38B in association with the above described example.

Figure 17:
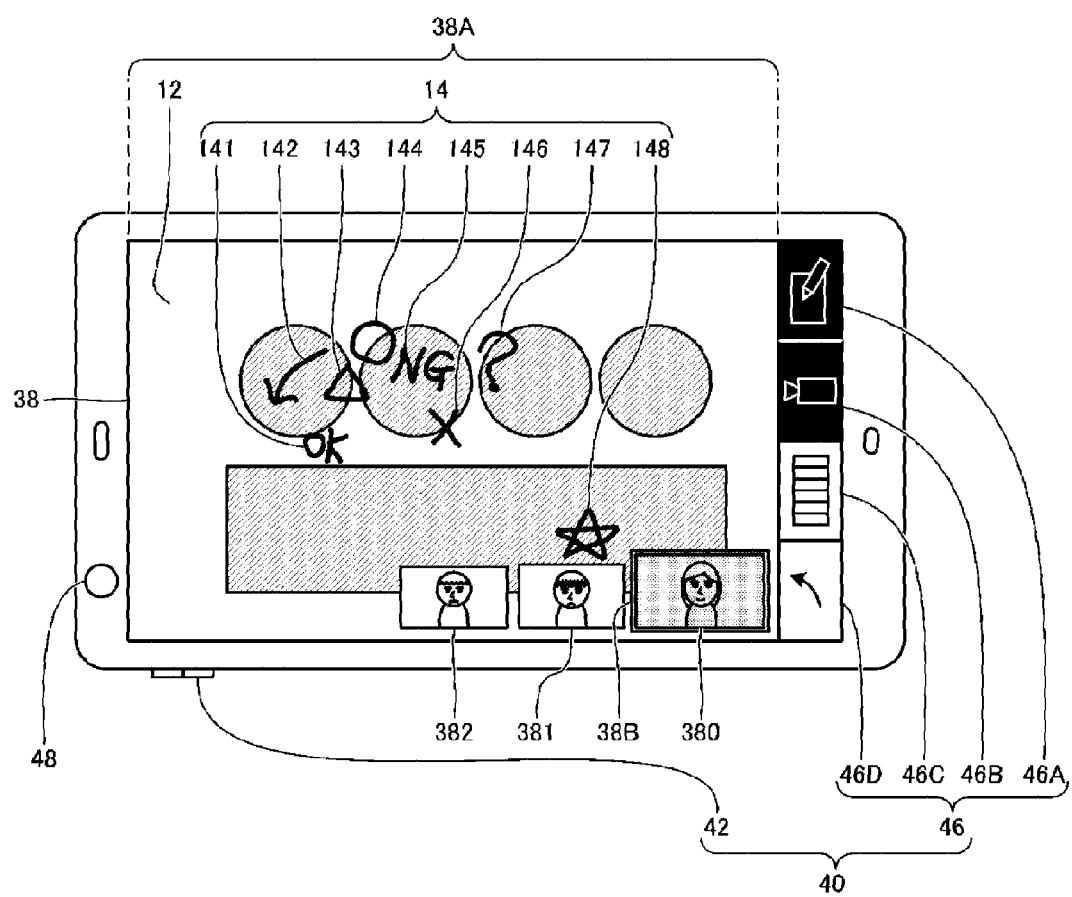
FIG. 17 is a view showing an example of a remote conference screen including the second display area in a second state.

If the capture images 380, 381 and 382 are being displayed ("YES" in Step S163), or if the display magnification is less than the threshold value ("NO" in Step S165), in Step S169, the CPU 32 outputs an instruction for displaying a portion of the shared material 12 corresponding to the area within the frame of the second display area 38B displayed in the Step S161, with brightness lower than brightness of a portion of the shared material 12 corresponding to the area outside of the frame of the second display area 38B, to the display 38. For example, the CPU 32 divides the brightness value of each of R, G, and B of each pixel within the frame of the second display area 38B by ½. In the display 38, the area within the frame of the second display area 38B becomes transparent, and the second display area 38B is displayed such that the portion of the shared material 12 corresponding to the area within the frame of the second display area 38B becomes a background (see FIG. 17). FIG. 17 shows a remote conference screen in a state where the display position of the capture image 380 of the communication apparatus 30 is set as the second display area 38B. After performing Step S167 or S169, the CPU 32 ends the second display area display process.

<Remote Conference Screen Operating Process>

The remote conference screen operating process which is performed in Step S97 of FIG. 8 will be described with reference to FIG. 18. In Step S171, the CPU 32 determines whether the operation position of the input which is received by the operation device 40 and is a cause of the positive result of Step S17 of FIG. 4 ("YES" in Step S17) is within the area set as the movement input area, and the area set as the movement input area is valid. If the movement input area is set in the first display area 38A (see Step S83 of FIG. 7), the CPU 32 determines whether the input received by the operation device 40 is an input on the touch pad 44, and corresponds to a position within the first display area 38A. If the movement input area is set in the first display area 38A, a process like Step S191 (to be described below) is not performed with respect to the first display area 38A. Therefore, if the movement input area is set in the first display area 38A, it is determined that the area set as the movement input area is valid. That is, if the movement input area is set in the first display area 38A, in Step S171, actually, the CPU 32 only determines whether the input received by the operation device 40 corresponds to a position within the first display area 38A. If the operation position of the input received by the operation device 40 is within the first display area 38A, the determination result of Step S171 by the CPU 32 becomes positive ("YES" in Step S171). Meanwhile, if the operation position is outside the first display area 38A, the determination result of Step S171 by the CPU 32 becomes negative ("NO" in Step S171).

Figure 10:
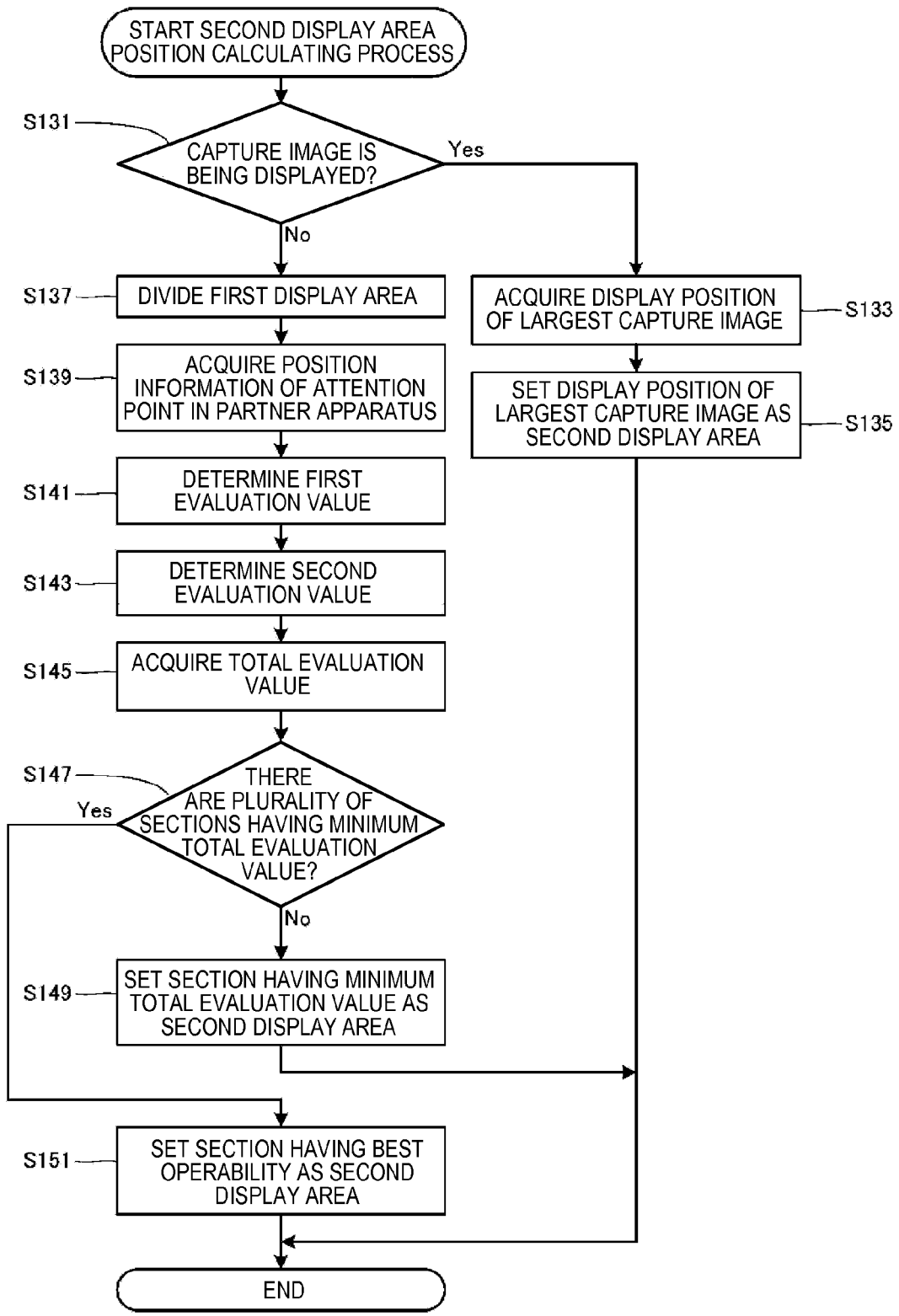
FIG. 10 is a flow chart of a second display area position calculating process.

If the communication apparatus 30 is in the annotation mode (see "YES" in Step S71 of FIG. 7), and the second display area 38B serving as the movement input area is set in Step S135, S149, or S151 of FIG. 10, the CPU 32 determines whether the input received by the operation device 40 is an input on the touch pad 44 and corresponds to a position within the second display area 38B, and whether the second display area 38B is valid. Validity of the second display area 38B is determined based on an invalidity flag stored in the RAM 36. If the invalidity flag is on, it is determined that the second display area 38B is not valid. Meanwhile, if the invalidity flag is off, it is determined that the second display area 38B is valid. If the input on the touch pad 44 corresponds to a position within the second display area 38B and the second display area 38B is valid, the determination result of Step S171 by the CPU 32 becomes positive ("YES" in Step S171). Meanwhile, if the input on the touch pad 44 does not correspond to any position within the second display area 38B, or the second display area 38B is not valid, the determination result of Step S171 by the CPU 32 becomes negative ("NO" in Step S171).

If the result of Step S171 is positive ("YES" in Step S171), in Step S173, the CPU 32 performs a material movement operating process. The material movement operating process will be described below. After performing the material movement operating process, the CPU 32 stores the current time acquired from the clock unit 52, as the last movement operation time, in Step S175, and ends the remote conference screen operating process. The last movement operation time is stored, for example, in the RAM 36.

If the result of Step S171 is negative ("NO" in Step S171), in Step S177, the CPU 32 determines whether the input received by the operation device 40 is an end of an annotation input operation. If the result of Step S171 is negative ("NO" in Step S171), the input which is received by the operation device 40 and is a cause of the positive result of Step S17 of FIG. 4 ("YES" in Step S17) is an operation associated with an annotation input operation (end or start of annotation input, or during annotation input). The CPU 32 determines an end or start of annotation input, or during annotation input, based on the detection result through the touch pad 44. For example, when sliding of a finger or the like detected by the touch pad 44 becomes not detected, the CPU 32 determines that the input received by the operation device 40 is an end of an annotation input operation.

If the input received by the operation device 40 is an end of an annotation input operation ("YES" in Step S177), in Step S179, the CPU 32 generates annotation data corresponding to an input annotation 14, and stores the annotation data. In Step S181, the CPU 32 transmits the stored annotation data from the communication unit 50 to the conference server 20. The annotation data is transmitted to each of the partner apparatuses 71 and 72 through the conference server 20. Subsequently, in Step S183, the CPU 32 performs the above-described second display area position calculating process (see FIG. 10). In the second display area position calculating process of Step S183, processes are performed also with respect to the annotation 14 newly input at that time. After the second display area position calculating process is performed, in Step S185, the CPU 32 validates the second display area 38B. In Step S185, the CPU 32 performs the same process as the above-described second display area display process (see FIG. 16), thereby validating the second display area 38B. In the display 38, similarly to the case of the second display area display process, the second display area 38B is displayed within the first display area 38A. The CPU 32 turns off the invalidity flag stored in the RAM 36. Thereafter, the CPU 32 resets the last movement operation time in Step S187, and ends the remote conference screen operating process.

If the input received by the operation device 40 is not an end of an annotation input operation ("NO" in Step S177), in Step S189, the CPU 32 determines whether the input received by the operation device 40 is a start of an annotation input operation. If new sliding of a finger or the like is detected by the touch pad 44 of an undetected state, the CPU 32 determines that the input received by the operation device 40 is a start of an annotation input operation. If the input received by the operation device 40 is not a start of an annotation input operation ("NO" in Step S189), the CPU 32 advances the process to Step S193. In this case, the input received by the operation device 40 is an input according to an annotation input operation of continuing annotation input with respect to an annotation 14 being input. If the input received by the operation device 40 is a start of an annotation input operation ("YES" in Step S189), in Step S191, the CPU 32 invalidates the second display area 38B. In Step S191, the CPU 32 outputs an instruction for switching the second display area 38B being displayed within the first display area 38A, to the non-display state, to the display 38. In the display 38, the second display area 38B disappears. The CPU 32 turns on the invalidity flag. For example, if the operation device 40 receives an input to the display position of the second display area 38B after Step S191, since the second display area 38B is invalidated, the CPU 32 determines that the corresponding input is an annotation input operation. Thereafter, the CPU 32 advances the process to Step S193.

In Step S193, the CPU 32 outputs an instruction for displaying the portion of the annotation 14 drawn according to sliding of the finger or the like such that the corresponding portion is superimposed on the shared material 12 being displayed in the first display area 38A, to the display 38. In the display 38, the portion of the newly input annotation 14 is displayed such that the corresponding portion is superimposed on the shared material 12 being displayed in the first display area 38A. Thereafter, the CPU 32 resets the last movement operation time in Step S195, and ends the remote conference screen operating process.

<Material Movement Operating Process>

The material movement operating process which is performed in Step S173 of FIG. 18 will be described with reference to FIG. 19. In Step S201, the CPU 32 determines whether the input received by the operation device 40 is a material movement operation on the touch pad 44. The input which is received by the operation device 40 and is a determination object is an input which is a cause of the positive results of Step S17 of FIG. 4 and Step S171 of FIG. 18 ("YES" in Steps S17 and S171) (This is the same in Step S213 to be described below). If the input received by the operation device 40 is a material movement operation on the touch pad 44 ("YES" in Step S201), in Step S203, the CPU 32 corrects a movement amount (change amount) corresponding to the input material movement operation, based on the display size ratio between the first display area 38A and the area set as the movement input area. For example, it is assumed that the second display area 38B serving as the movement input area is set in Step S135, S149, or S151 of FIG. 10, and the vertical and horizontal widths of the second display area 38B are ¼ of those of the first display area 38A. In this case, the movement amount corresponding to the input material movement operation is corrected to 4 times a coordinate change amount which is a reference. The coordinate change amount which is a reference is a coordinate change amount when the same material movement operation is input to the first display area 38A when the movement input area is the first display area 38A. Also, a correction amount when the first display area 38A is set as the movement input area in Step S83 of FIG. 7 is 1 time (non-correction).

Subsequently, in Step S205, the CPU 32 determines whether the thumbnail image is being displayed within the frame of the second display area 38B. Displaying of the thumbnail image within the frame of the second display area 38B is performed in Step S167 of FIG. 16. If the thumbnail image is not being displayed ("NO" in Step S205), the CPU 32 advances the process to Step S209. If the movement input area is set in the first display area 38A (see Step S83 of FIG. 7), or if the inside of the frame of the second display area 38B is in a state according to Step S169 of FIG. 16, the result of Step S205 becomes negative ("NO" in Step S205).

If the thumbnail image is being displayed ("YES" in Step S205), in Step S207, the CPU 32 corrects the movement amount corresponding to the operation amount of the material movement operation having been input. With respect to correction in Step S207, if Step S203 is performed, in Step S207, the movement amount is corrected to an amount obtained by multiplying the coordinate change amount which is a reference, by a value according to the size ratio of Step S203, and multiplying the obtained value by a predetermined value. If Step S203 is not performed, in the Step S207, the movement amount is corrected to an amount obtained by multiplying the coordinate change amount which is a reference, by the predetermined value. The predetermined value in Step S207 is, for example, 5. Also, the predetermined value of Step S207 may be a value for displaying a position of the shared material 12 which corresponds to a position within the thumbnail image and where sliding of a finger or the like is last detected by the touch pad 44, for example, at the central portion of the first display area 38A. After performing Step S207, the CPU 32 advances the process to Step S209.

In Step S209, the CPU 32 determines the display portion of the shared material 12 after movement, based on the movement amount corrected by Steps S203 to S207. Subsequently, in Step S211, the CPU 32 performs the material display process. The material display process will be described below. After performing the material display process, the CPU 32 ends the material movement operating process.

Returning to a description of Step S201, if the input received by the operation device 40 is not a material movement operation on the touch pad 44 ("NO" in Step S201), in Step S213, the CPU 32 determines whether the input received by the operation device 40 is a display magnification change operation. If the input received by the operation device 40 is a display magnification change operation ("YES" in Step S213), in Step S215, the CPU 32 changes the display magnification of the shared material 12 being displayed in the first display area 38A. Subsequently, in Step S217, the CPU 32 performs the material display process. The material display process will be described below. After performing the material display process, the CPU 32 ends the material movement operating process.

<Material Display Process>

The material display process which is performed in Step S65 of FIG. 6, and Steps S211 and S217 of FIG. 19 will be described with reference to FIG. 20. In Step S221, the CPU 32 outputs an instruction for displaying the shared material 12 in the first display area 38A, to the display 38. The CPU 32 performs display of the shared material 12 according to a condition set in Step S63 of FIG. 6 or determined in Step S209 or S215 of FIG. 19. In the display 38, the material 12 is displayed in a new state in the first display area 38A. In the material display process of Step S65 of FIG. 6, in a state where the upper left end of the shared material 12 is disposed at the upper left end of the first display area 38A, and the display magnification is set to 1 time, a part or all of the shared material 12 is displayed in the first display area 38A. In the material display process of Step S211 of FIG. 19, the portion of the shared material 12 determined in Step S209 of FIG. 19 is displayed in the first display area 38A. In the material display process of Step S217 of FIG. 19, a part or all of the shared material 12 enlarged or reduced with the display magnification changed in Step S215 of FIG. 19 is displayed in the first display area 38A.

Subsequently, in Step S223, the CPU 32 acquires annotation data existing in the display range of the shared material 12 displayed in a new state in Step S221, and outputs an instruction for displaying the annotation data, to the display 38. The CPU 32 specifies the annotation data existing in the display range of the shared material 12 being displayed in the first display area 38A, according to the position information included in the annotation data, and acquires the specified annotation data. In the display 38, annotations 14 corresponding to the acquired annotation data are displayed in the first display area 38A such that the annotations are superimposed on the shared material 12. Thereafter, the CPU 32 ends the material display process.

Effects of Illustrative Embodiment

According to the above described illustrative embodiment, the following effects can be achieved.

Figure 18:
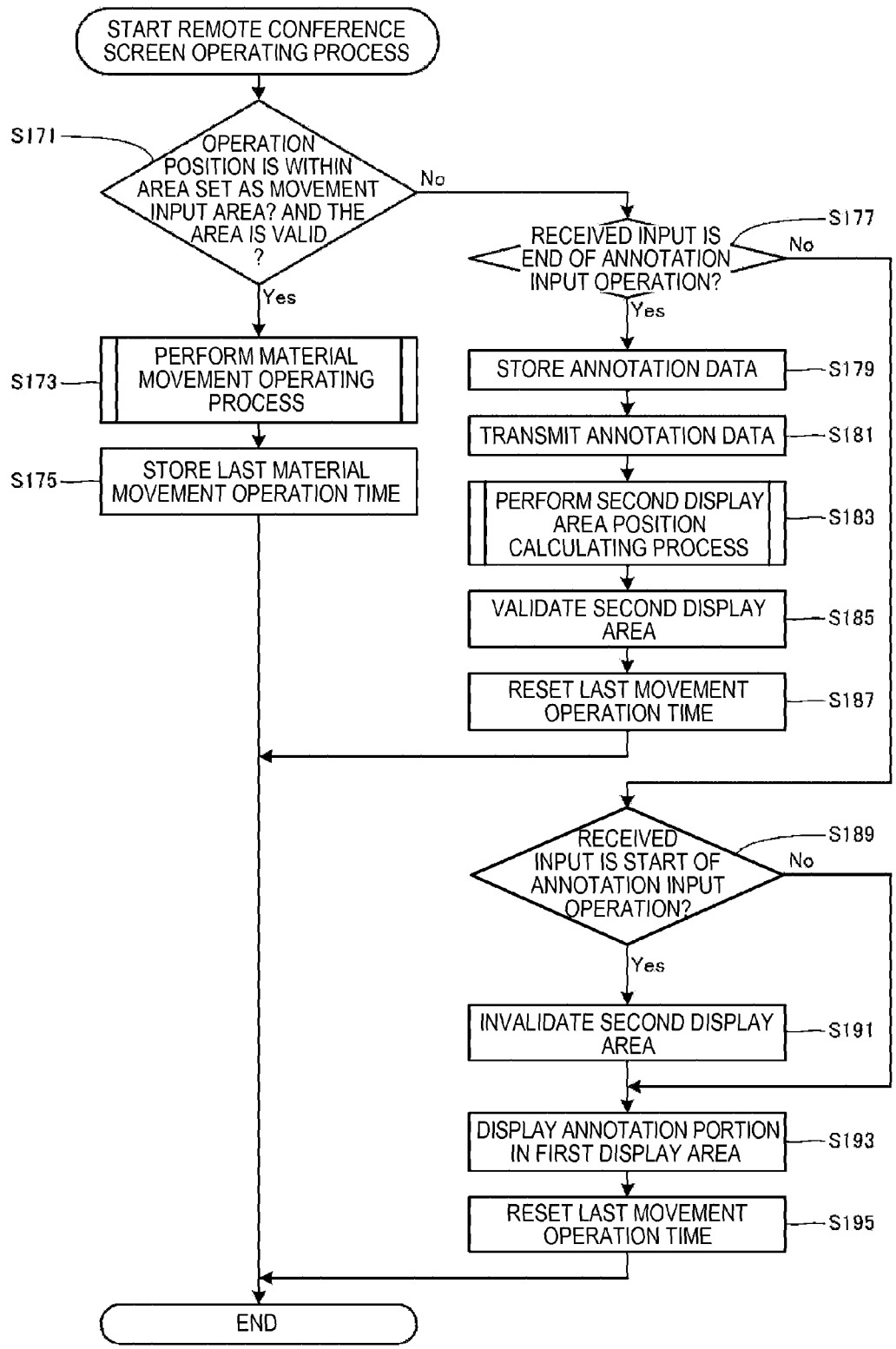
FIG. 18 is a flow chart of a remote conference screen operating process.

(1) The communication apparatus 30 is provided with the movement mode and the annotation mode, and in a state where the communication apparatus 30 is in the annotation mode (see "YES" in Step S31 of FIG. 5), by the second display area position calculating process (see Step S33 (FIG. 10) of FIG. 5), the second display area 38B serving as the movement input area is set (see Step S135, S149, or S151 of FIG. 10), and a material movement operation is received in the second display area 38B (see "YES" in Step S171 of FIG. 18, and Step S173 (FIG. 19)). Therefore, in the communication apparatus 30, it is possible to implement appropriate operability to display of the shared material 12, and input of annotations 14 to the shared material 12. The user of the communication apparatus 30 can smoothly perform a material movement operation and an annotation input operation.

Figure 16:
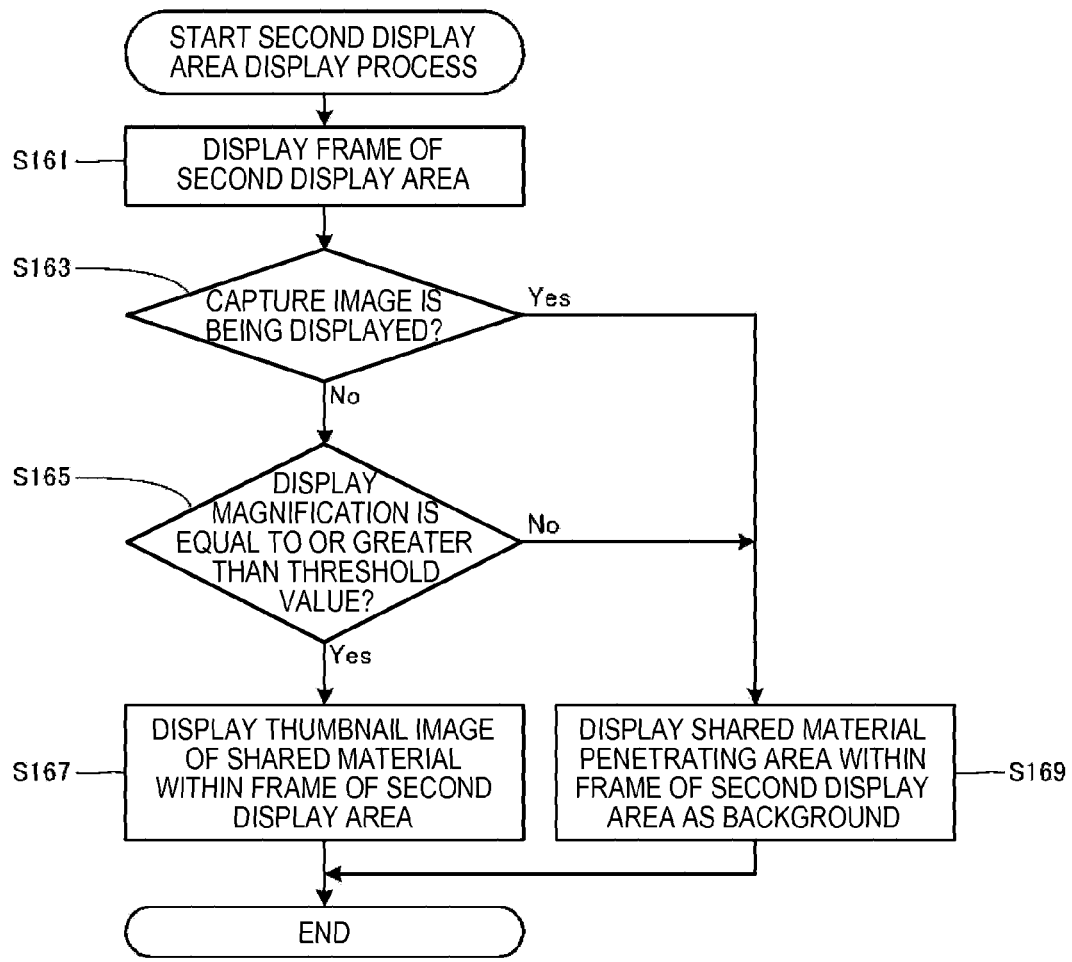
FIG. 16 is a flow chart of a second display area display process.

(2) If the capture images 380, 381 and 382 are being displayed (see "YES" in Step S131 of FIG. 10), the display position of a capture image having the largest display size (see the capture image 380 in the example shown in FIG. 2) is set as the second display area 38B (see Step S135 of FIG. 10), and the second display area 38B is displayed (see Steps S161 and S169 of FIG. 16). Therefore, it is possible to display the second display area 38B such that the second display area 38B is superimposed on the capture image 380 having the largest display size, for example, as shown in FIG. 17. If the second display area 38B is set to include any one of the capture images 380, 381 and 382, it is possible to suppress an annotation input operation to the first display area 38A from being obstructed.

If the display magnification of the shared material 12 is equal to or greater than the threshold value (see "YES" in Step S165 of FIG. 16), the thumbnail image corresponding to the shared material 12 is displayed within the frame of the second display area 38B displayed in Step S161 of FIG. 16 (see FIG. 3, and Step S167 of FIG. 16). Therefore, the user of the communication apparatus 30 can perform a material movement operation with respect to the second display area 38B while confirming the thumbnail image of the shared material 12.

(3) If the capture images 380, 381 and 382 are not being displayed (see "NO" in Step S131 of FIG. 10), according to the total evaluation values (see Step S145 of FIG. 10, and FIG. 14) based on the first evaluation values (see Step S141 of FIG. 10, and "1:" of FIG. 12), the second evaluation values (see Step S143 of FIG. 10, and "2:" of FIG. 12), and the third evaluation values (see FIG. 13), a section having the minimum total evaluation value is set as the second display area 38B (see Step S149 of FIG. 10). At that time, if there is a plurality of sections having the minimum total evaluation value (see "YES" in Step S147 of FIG. 10), based on the operability table (see FIG. 15), a section having the best operability is set as the second display area 38B (see Step S151 of FIG. 10). Therefore, it is possible to set the second display area 38B in view of the attention points of the partner apparatuses 71 and 72, the positions of the annotations 14, and the like.

(4) After the material movement operating process (FIG. 19) of Step S173 of FIG. 18 is performed, the last material movement operation time is stored (see Step S175 of FIG. 18), and if a predetermined time elapses from the last material movement operation time (see "YES" in Step S29 of FIG. 5), the second display area position calculating process (see Step S33 (FIG. 10) of FIG. 5) is performed, and the second display area display process (see Step S35 (FIG. 16) of FIG. 5) is performed. Also, if the input received by the operation device 40 is an end of an annotation input operation (see "YES" in Step S177 of FIG. 18), the second display area position calculating process (see Step S183 (FIG. 10) of FIG. 18) is performed, and the second display area 38B is validated (see Step S185 of FIG. 18). Therefore, it is possible to re-set the second display area 38B according to elapse of time, and input of an annotation 14. It is possible to prevent the second display area 38B from being continuously displayed at a constant position, and to re-arrange the second display area 38B.

(5) If the input received by the operation device 40 is a start of an annotation input operation (see "YES" in Step S189 of FIG. 18), the second display area 38B is invalidated (see Step S191 of FIG. 18). Therefore, during input of an annotation 14, even if an annotation input operation is performed to an area set as the second display area 38B before invalidation, this operation can be treated as an annotation input operation. The user of the communication apparatus 30 can appropriately input an annotation 14. If the annotation input operation ends ("YES" in Step S177 of FIG. 18), the CPU 32 performs the second display area position calculating process (see FIG. 10) in Step S183 of FIG. 18, and performs the same process as the second display area display process (FIG. 19) in Step S185 of FIG. 18, thereby validating the second display area 38B, and displays the second display area 38B. Therefore, after inputting an annotation 14, the user of the communication apparatus 30 can perform a material movement operation to the second display area 38B.

Figure 19:
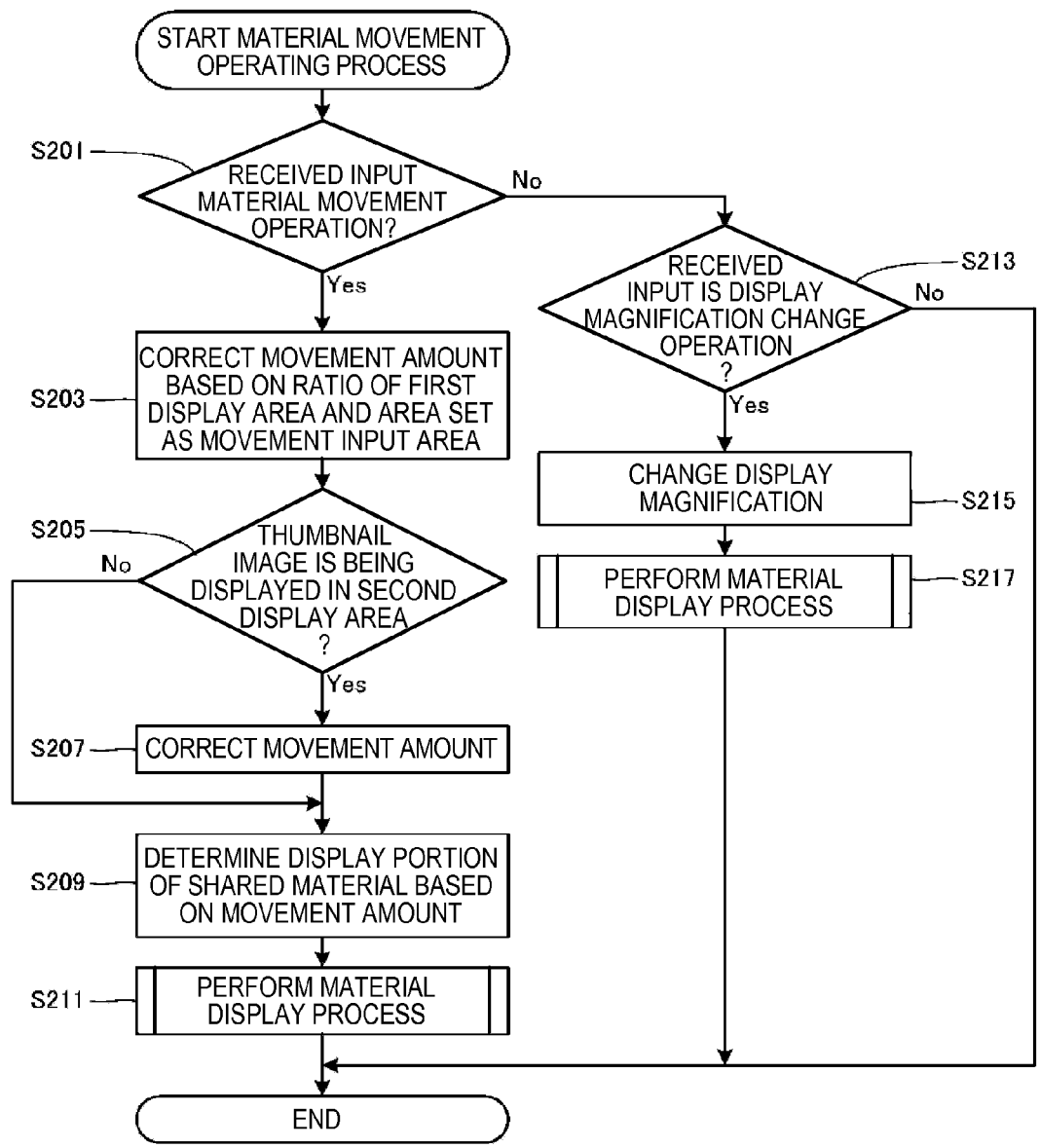
FIG. 19 is a flow chart of a material movement operating process.
Figure 20:
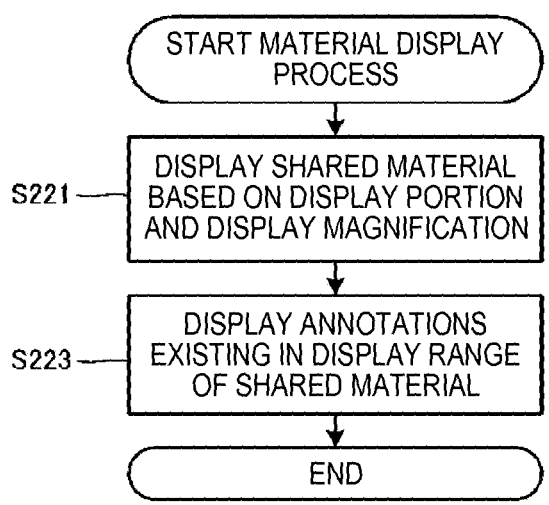
FIG. 20 is a flow chart of a material display process.

(6) With respect to a material movement operation to the second display area 38B, the CPU 32 corrects the movement amount (change amount) (see Steps S203 and S205 of FIG. 19). Therefore, it is possible to smoothly move the display portion of the shared material 12 being displayed in the first display area 38A on the display 38.

Modified Illustrative Embodiment

The above described illustrative embodiment may be modified as follows.

(1) In the above, the communication apparatus 30 including the display 38, the touch pad 44 and the camera 48 connected integrally has been described as an example. The communication apparatus 30 may have a configuration in which the display 38 and the touch pad 44 are separate from each other.

(2) In the above, in the remote conference system 10, a configuration in which the capture image data captured by the communication apparatus 30 is transmitted from the communication apparatus 30 to each of the partner apparatuses 71 and 72 through the conference server 20, and the capture image data captured respectively by the partner apparatuses 71 and 72 is transmitted from the partner apparatuses 71 and 72 to the communication apparatus 30 through the conference server 20 has been described as an example. In the remote conference system 10, together with the capture image data, voice data corresponding to the capture image data may be transmitted and received through the conference server 20. In the communication apparatus 30 and the partner apparatuses 71 and 72, voices are acquired through microphones, and voice data corresponding to the acquired voices are generated and are transmitted together with the capture image data. In each of the communication apparatus 30 and the partner apparatuses 71 and 72, voice data of the other terminal devices are reproduced and are output from a speaker. In this point, the remote conference system is the same as known remote conference systems. Therefore, other descriptions relating to the voice data will not be made.

(3) In the above, in Step S133 of the second display area position calculating process shown in FIG. 10, the CPU 32 acquires the display position of an image having the largest display size (the capture image 380 in the example shown in FIG. 2) on the display 38, and sets the display position acquired in Step S135, as the second display area 38B. The display position which is acquired in Step S133 may not be the display position of an image having the largest display size. Also, the display position which is acquired in Step S133 may be the display position of the capture image 380 of the communication apparatus 30, regardless of the display size. It can be considered that it is often unnecessary to especially confirm the capture image 380 of the own communication apparatus 30 to participate in a remote conference.

What is claimed is:

1. A non-transitory computer-readable medium storing computer-readable instructions, the instructions, when executed by a processor of a first communication apparatus configured to participate in a remote conference between the first communication apparatus and a second communication apparatus via a network, causing the processor to perform operations comprising:

a display control operation outputting, to a display connected to the first communication apparatus, an instruction representing displaying a first portion of a shared material in a first display area within a remote conference screen, the remote conference screen being displayed in the display and including display items relating to the remote conference between the first communication apparatus and the second communication apparatus via the network, the shared material corresponding to shared material data shared in the remote conference;

a setting operation setting, in a state where the first communication apparatus is in a first state for receiving an input of an annotation to the shared material, a second display area within the remote conference screen, the second display area being configured to receive a first input, the second display area being smaller than the first display area;

an input acquiring operation acquiring an input to the remote conference screen via an operation device connected to the first communication apparatus;

an input determining operation determining, when the second display area is set by the setting operation, whether the input acquired by the input acquiring operation is the first input or a second input, the first input being an input to a position within the second display area, the second input being an input to a position outside the second display area and within the first display area; and a communication control operation transmitting, when the input determining operation determines that the input acquired by the input acquiring operation is the second input, data representing an annotation corresponding to the second input to the second communication apparatus, wherein the display control operation comprises:

outputting, to the display, an instruction representing displaying the second display area set by the setting operation in a state different from the first display area, in response to the input determining operation determining that the input acquired by the input acquiring operation is the first input, outputting, to the display, an instruction representing changing a portion of the shared material displayed in the first display area from the first portion to a second portion of the shared material, the second portion being different from the first portion, and in response to the input determining operation determining that the input acquired by the input acquiring operation is the second input, outputting, to the display, an instruction representing displaying the annotation corresponding to the second input to be superimposed on the first portion in the first display area.

2. The non-transitory computer-readable medium according to claim 1, wherein the setting operation comprises setting a partial area within the first display area as the second display area, a capture image corresponding to capture image data being displayed in the partial area, the capture image data being one of first data captured by the second communication apparatus and received from the second communication apparatus and second data captured by a camera connected to the first communication apparatus, and wherein the display control operation comprises outputting, to the display, an instruction representing displaying the capture image in a state different from the first display area.

3. The non-transitory computer-readable medium according to claim 2, wherein the operations performed by the processor further comprise:

a display determining operation determining whether the capture image is being displayed in the partial area within the first display area, and wherein the setting operation comprises, in response to the display determining operation determining that the capture image is being displayed, setting, as the second display area, the partial area within the first display area in which the capture image being displayed.

4. The non-transitory computer-readable medium according to claim 1,
wherein the operations performed by the processor further comprise:
a first acquiring operation acquiring position information from the second communication apparatus, the position information representing a certain position of the shared material displayed within a third display area, the third display area being an area in another conference screen which is displayed on a display of the second communication apparatus and includes display items relating to the remote conference, and
wherein the setting operation comprises:
determining, with respect to a position on the first display area, a first evaluation value corresponding to a distance between the certain position represented by the position information and the position on the first display area, and
specifying a position of the second display area based on the first evaluation value to set the second display area at the specified position.

5. The non-transitory computer-readable medium according to claim 4,
wherein the setting operation comprises determining the first evaluation value with respect to each of a plurality of sections within the first display area such that the first evaluation value becomes higher for a section closer to the certain position represented by the position information, the plurality of sections being obtained by dividing the first display area.

6. The non-transitory computer-readable medium according to claim 5,
wherein the setting operation comprises setting, as the second display area, a section having the least first evaluation value.

7. The non-transitory computer-readable medium according to claim 1,
wherein the operations performed by the processor further comprise:
a second acquiring operation acquiring a position of an annotation to the shared material, and
wherein the setting operation comprises:
determining, with respect to a position on the first display area, a second evaluation value corresponding to the position of the annotation, and
specifying a position of the second display area based on the second evaluation value to set the second display area at the specified position.

8. The non-transitory computer-readable medium according to claim 7,
wherein the setting operation comprises:
acquiring, with respect to each of a plurality of sections within the first display area, a number of annotations input to the section based on positions of annotations acquired by the second acquiring operation, the plurality of sections being obtained by dividing the first display area, and
determining the second evaluation values such that the second evaluation values become higher for a section having a larger number of annotations.

9. The non-transitory computer-readable medium according to claim 8,
wherein the setting operation comprises setting, as the second display area, a section having the least second evaluation value.

10. The non-transitory computer-readable medium according to claim 1,
wherein the setting operation comprises re-setting the second display area when a predetermined time has elapsed after the input determined as the first input by the input determining operation is acquired by the input acquiring operation.

11. The non-transitory computer-readable medium according to claim 1,
wherein the operations performed by the processor further comprise:
an end determining operation determining whether the second input ends based on the input acquired by the input acquiring operation, and
wherein the setting operation comprises re-setting the second display area in response to the end determining operation determining that the second input ends.

12. The non-transitory computer-readable medium according to claim 1,
wherein the display control operation comprises outputting, to the display, an instruction representing displaying a thumbnail image in the second display area, the thumbnail image corresponding to the shared material including the first portion displayed in the first display area.

13. The non-transitory computer-readable medium according to claim 1,
wherein the setting operation comprises setting a partial area within the first display area as the second display area, and
wherein the display control operation comprises outputting, to the display, an instruction representing displaying a portion of the shared material corresponding to a position of the second display area with brightness lower than brightness of a portion of the shared material corresponding to a position outside of the second display area.

14. The non-transitory computer-readable medium according to claim 1,
wherein the display control operation comprises, in response to the input determining operation determining that the input acquired by the input acquiring operation is the first input, outputting, to the display, an instruction representing displaying, as the second portion, a portion of the shared material which is separate from the first portion by a change amount in the first display area, the change amount being obtained by multiplying a coordinate change amount of an operation to the second display area by a first value.

15. The non-transitory computer-readable medium according to claim 1,
wherein the display control operation comprise, in response to the input determining operation determining that the input acquired by the input acquiring operation is the first input, outputting, to the display, an instruction representing displaying, as the second portion, a portion of the shared material which is separate from the first portion by a change amount in the first display area, the change amount being obtained by multiplying a coordinate change amount of an operation to the second display area by a second value which corresponds to a ratio of a size of the first display area to a size of the second display area.

16. The non-transitory computer-readable medium according to claim 1,
wherein the setting operation comprises, in response to the input determining operation determining that the input acquired by the input acquiring operation is the second input, invalidating the second display area at least until the second input ends, and
wherein the input determining operation comprises determining that, when the second display area is invalidated, the input acquired by the input acquiring operation is the second input even if the input is performed to the second display area.

17. The non-transitory computer-readable medium according to claim 1,
wherein the operations performed by the processor further comprise:
a switching operation switching the first communication apparatus between the first state and a second state in which an input of an annotation is not received, based on an input acquired by the input acquiring operation, and
wherein the setting operation comprises setting the second display area when the first communication apparatus is in the first state, while not setting the second display area when the first communication apparatus is in the second state.

18. A first communication apparatus configured to participate in a remote conference with a second communication apparatus via a network, the first communication apparatus comprising:
a processor,
memory storing instructions, when executed by the processor, causing the processor to perform operations comprising:
a display control operation outputting, to a display connected to the first communication apparatus, an instruction representing displaying a first portion of a shared material in a first display area within a remote conference screen, the remote conference screen being displayed in the display and including display items relating to the remote conference between the first communication apparatus and the second communication apparatus via the network, the shared material corresponding to shared material data shared in the remote conference;
a setting operation setting, in a state where the first communication apparatus is in a first state for receiving an input of an annotation to the shared material, a second display area within the remote conference screen, the second display area being configured to receive a first input, the second display area being smaller than the first display area;
an input acquiring operation acquiring an input to the remote conference screen via an operation device connected to the first communication apparatus;
an input determining operation determining, when the second display area is set by the setting operation, whether the input acquired by the input acquiring operation is the first input or a second input, the first input being an input to a position within the second display area, the second input being an input to a position outside the second display area and within the first display area; and
a communication control operation transmitting, when the input determining operation determines that the input acquired by the input acquiring operation is the second input, data representing an annotation corresponding to the second input to the second communication apparatus,
wherein the display control operation comprises:
outputting, to the display, an instruction representing displaying the second display area set by the setting operation in a state different from the first display area,
in response to the input determining operation determining that the input acquired by the input acquiring operation is the first input, outputting, to the display, an instruction representing changing a portion of the shared material displayed in the first display area from the first portion to a second portion of the shared material, the second portion being different from the first portion, and
in response to the input determining operation determining that the input acquired by the input acquiring operation is the second input, outputting, to the display, an instruction representing displaying the annotation corresponding to the second input to be superimposed on the first portion in the first display area.

19. The first communication apparatus according to claim 18,
wherein the operation device and the display configure a touch panel, and include a touch pad configured to receive the first input and the second input.

20. A control method of a first communication apparatus for participating in a remote conference with a second communication apparatus via a network, the method comprising:
outputting, to a display connected to the first communication apparatus, an instruction representing displaying a first portion of a shared material in a first display area within a remote conference screen, the remote conference screen being displayed in the display and including display items relating to the remote conference between the first communication apparatus and the second communication apparatus via the network, the shared material corresponding to shared material data shared in the remote conference;
in a state where the first communication apparatus is in a first state for receiving an input of an annotation to the shared material, setting a second display area within the remote conference screen, the second display area being configured to receive a first input, the second display area being smaller than the first display area;
acquiring an input to the remote conference screen via an operation device connected to the first communication apparatus;
when the second display area is set by the setting step, determining whether the input acquired by the input acquiring step is the first input or a second input, the first input being an input to a position within the second display area, the second input being an input to a position outside the second display area and within the first display area; and
when the input determining step determines that the input acquired by the input acquiring step is the second input, transmitting data representing an annotation corresponding to the second input to the second communication apparatus,
wherein the display control step comprises:
outputting, to the display, an instruction representing displaying the second display area set by the setting step in a state different from the first display area, in response to the input determining step determining that the input acquired by the input acquiring step is the first input, outputting, to the display, an instruction representing changing a portion of the shared material displayed in the first display area from the first portion to a second portion of the shared material, the second portion being different from the first portion, and in response to the input determining step determining that the input acquired by the input acquiring step is the second input, outputting, to the display, an instruction representing displaying the annotation corresponding to the second input to be superimposed on the first portion in the first display area.

* * * * *